(12) United States Patent
Kamikura

(10) Patent No.: US 12,188,844 B2
(45) Date of Patent: Jan. 7, 2025

(54) TIRE GROUND CONTACT CHARACTERISTIC MEASURING METHOD, TIRE GROUND CONTACT CHARACTERISTIC MEASURING PORTION, AND TIRE GROUND CONTACT CHARACTERISTIC MEASURING SYSTEM

(71) Applicant: BRIDGESTONE CORPORATION, Tokyo (JP)

(72) Inventor: Takahisa Kamikura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 343 days.

(21) Appl. No.: 17/298,829

(22) PCT Filed: Jul. 11, 2019

(86) PCT No.: PCT/JP2019/027524
§ 371 (c)(1),
(2) Date: Jun. 1, 2021

(87) PCT Pub. No.: WO2020/115940
PCT Pub. Date: Jun. 11, 2020

(65) Prior Publication Data
US 2022/0034755 A1 Feb. 3, 2022

(30) Foreign Application Priority Data
Dec. 4, 2018 (JP) .................. 2018-227656

(51) Int. Cl.
*G01M 17/02* (2006.01)
(52) U.S. Cl.
CPC .................. *G01M 17/022* (2013.01)
(58) Field of Classification Search
CPC .................................. G01M 17/022
See application file for complete search history.

(56) References Cited

U.S. PATENT DOCUMENTS

| 6,546,791 B2 | 4/2003 | Yurjevich |
| 2009/0095064 A1 | 4/2009 | Imanishi et al. |
| 2015/0135812 A1* | 5/2015 | Kuwayama ......... G01M 17/022 73/146 |

FOREIGN PATENT DOCUMENTS

| CN | 101421604 A | 4/2009 |
| CN | 102323068 A | 1/2012 |

(Continued)

OTHER PUBLICATIONS

International Search Report for PCT/JP2019/027524 dated Oct. 8, 2019 (PCT/ISA/210).

(Continued)

*Primary Examiner* — Timothy P Graves
(74) *Attorney, Agent, or Firm* — Sughrue Mion, PLLC

(57) ABSTRACT

A tire ground contact characteristic measuring method according to the present invention includes: a reproduction step of reproducing a transient change in a tire attitude that occurs during travel of an actual vehicle on a tire; a stress measurement step of causing stress measuring portion embedded on a rotatable rotary drum to measure stress that is applied to the tire in contact with the rotary drum that is rotationally driven; and a calculation step of calculating tire ground contact characteristics, which are characteristics of a ground contact region of a tread surface of the tire in contact with the rotary drum on the basis of the stress measured by the stress measuring portion. The tire ground contact characteristics calculated in the calculation step are tire ground contact characteristics of the tire corresponding to the tire attitude of the actual vehicle at each point in time during a period where the transient change occurs.

8 Claims, 13 Drawing Sheets

(56) References Cited

FOREIGN PATENT DOCUMENTS

| EP | 1 422 508 A1 | | 5/2004 | |
|----|----|----|----|----|
| GB | 2544301 A | * | 5/2017 | .......... G01M 17/022 |
| JP | 5-52711 A | | 3/1993 | |
| JP | 8-35915 A | | 2/1996 | |
| JP | 2002-79815 A | | 3/2002 | |
| JP | 2002-356106 A | | 12/2002 | |
| JP | 2003-4596 A | | 1/2003 | |
| JP | 2003-294585 A | | 10/2003 | |
| JP | 2007-78453 A | | 3/2007 | |
| JP | 2008-195341 A | | 8/2008 | |
| JP | 2009-180715 A | | 8/2009 | |
| JP | 2011-203207 A | | 10/2011 | |
| JP | 2014-21012 A | | 2/2014 | |
| JP | 2014-145785 A | | 8/2014 | |
| JP | 2015-40762 A | | 3/2015 | |
| JP | 2015040762 A | * | 3/2015 | |
| JP | 2017-26468 A | | 2/2017 | |
| JP | 2017-90234 A | | 5/2017 | |
| KR | 10-2017-0142432 A | | 12/2017 | |

OTHER PUBLICATIONS

Extended European Search Report dated Aug. 10, 2022 in European Application No. 19893973.8.
Chinese Office action issued Sep. 29, 2023 in Application No. 201980079688.8.
Chinese Search Report issued Mar. 28, 2024 in Application No. 201980079688.8.

* cited by examiner

FIG. 4
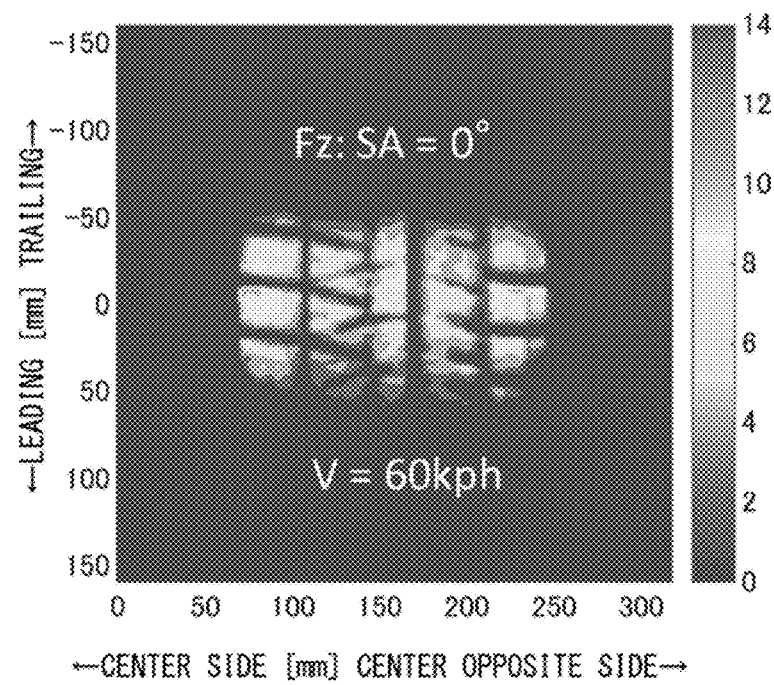
(A)
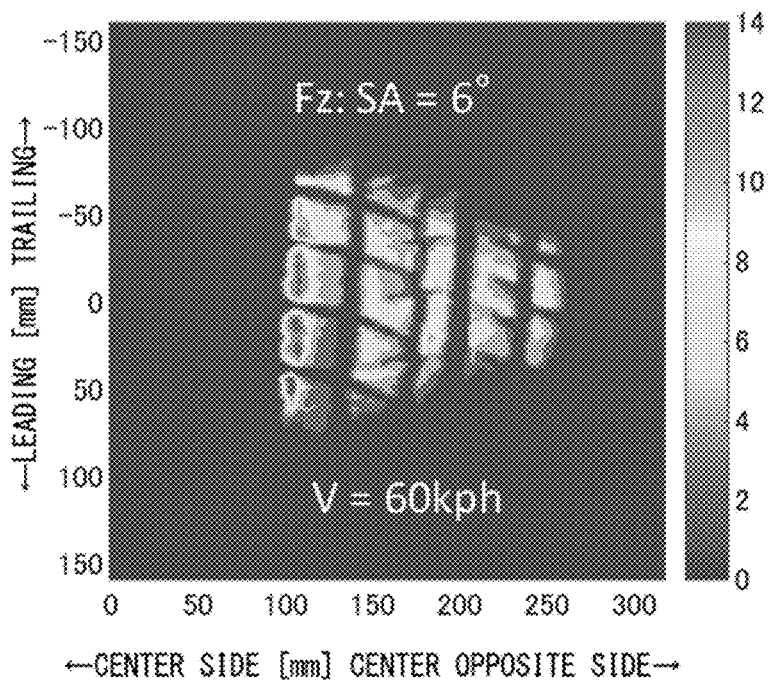
(B)

FIG. 6
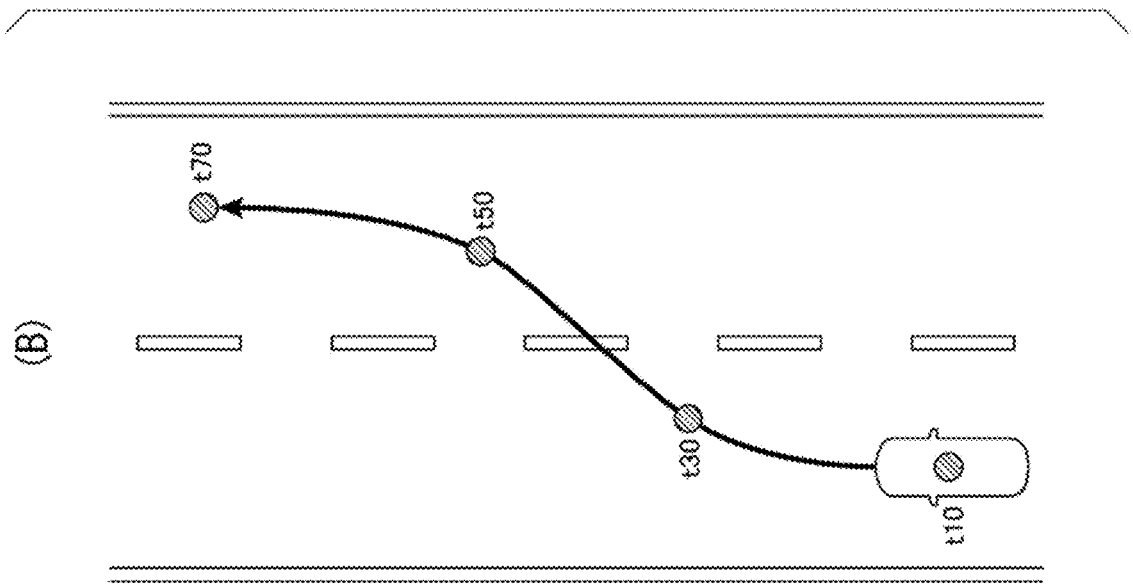
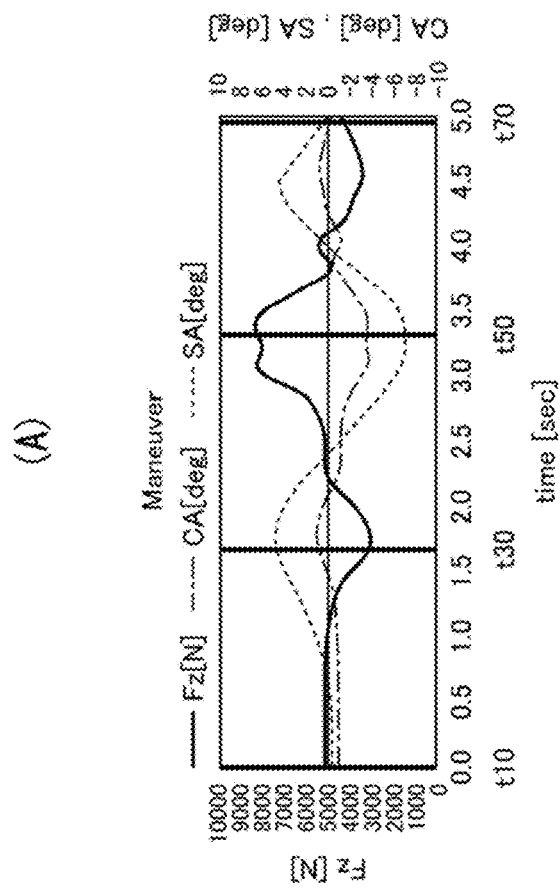

FIG. 7
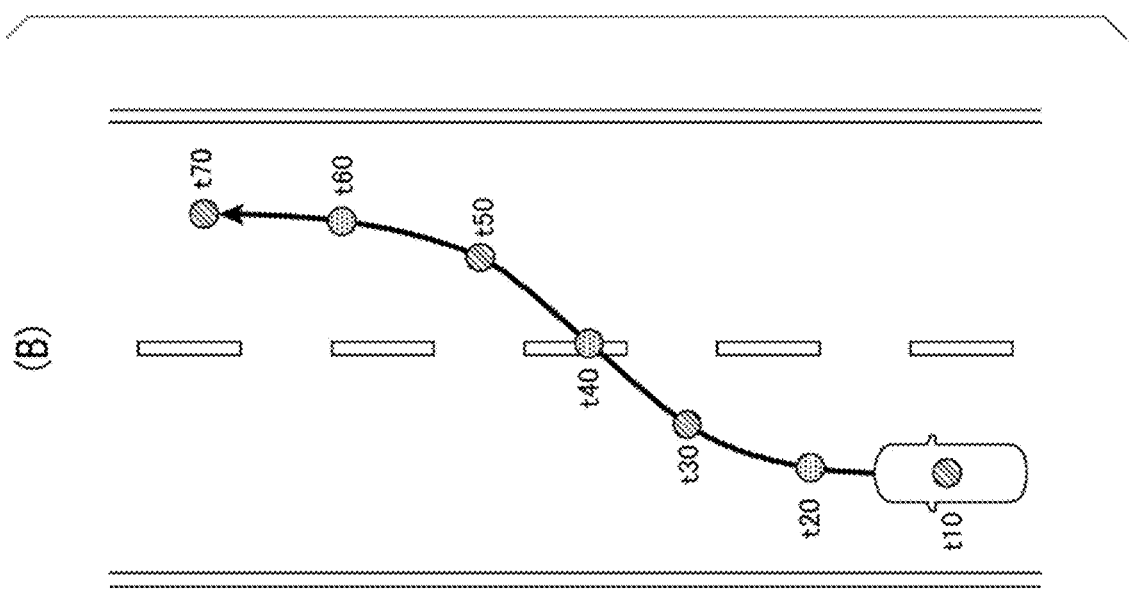
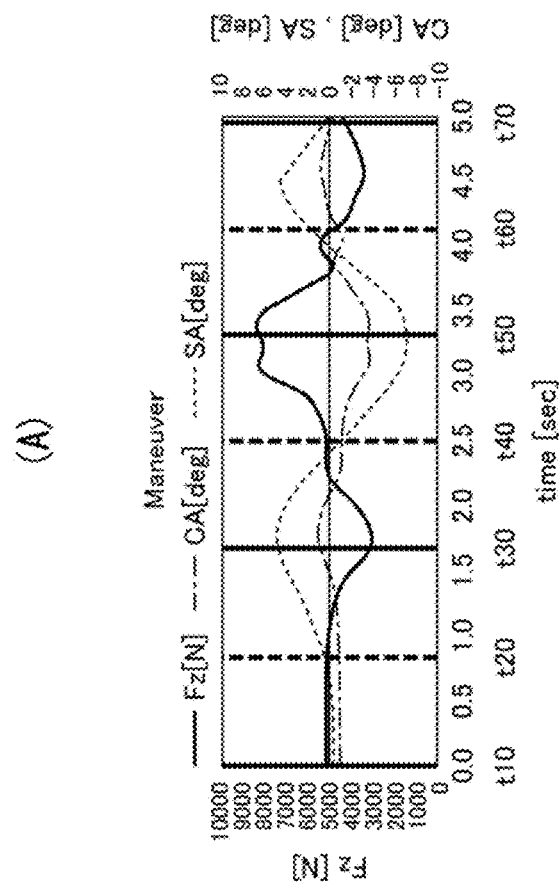

FIG. 8
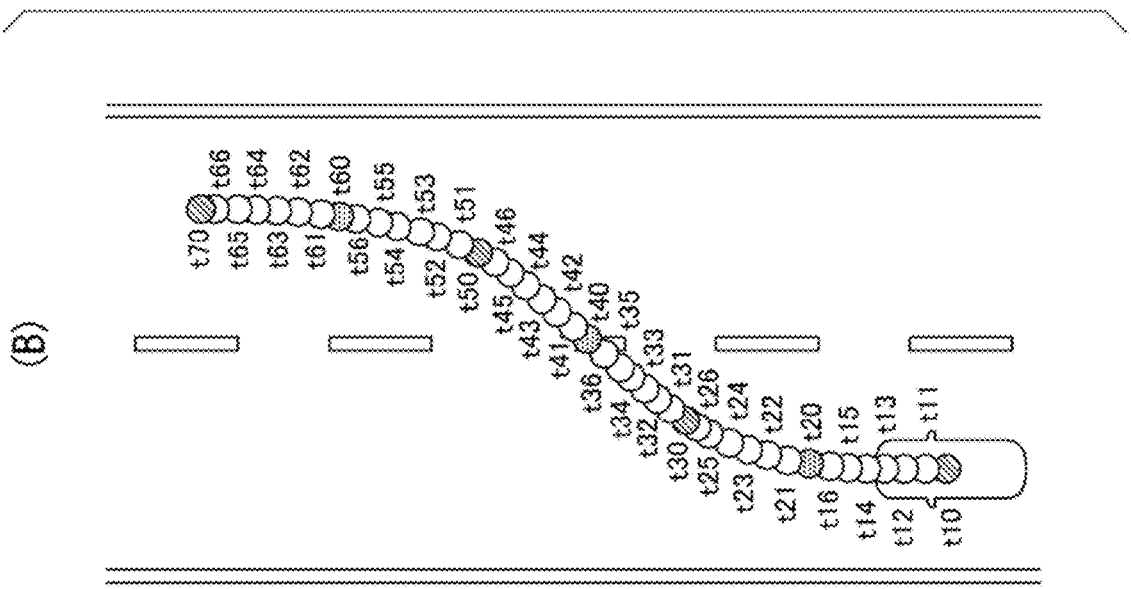
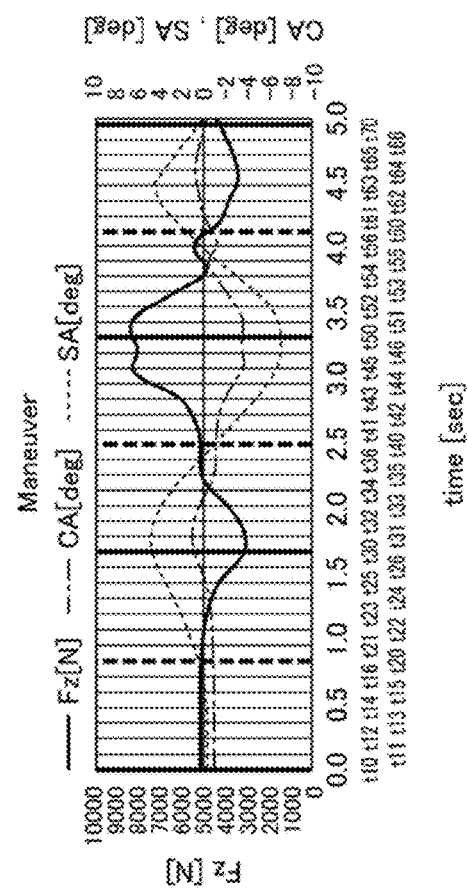

TIRE GROUND CONTACT CHARACTERISTIC MEASURING METHOD, TIRE GROUND CONTACT CHARACTERISTIC MEASURING PORTION, AND TIRE GROUND CONTACT CHARACTERISTIC MEASURING SYSTEM

CROSS REFERENCE TO RELATED APPLICATIONS

This application is a National Stage of International Application No. PCT/JP2019/027524 filed Jul. 11, 2019, claiming priority based on Japanese Patent Application No. 2018-227656 filed Dec. 4, 2018.

TECHNICAL FIELD

The present invention relates to a tire ground contact characteristic measuring method, a tire ground contact characteristic measuring portion, and a tire ground contact characteristic measuring system.

Priority is claimed on Japanese Patent Application No. 2018-227656, filed on Dec. 4, 2018, the content of which is incorporated herein by reference.

BACKGROUND ART

Patent Document 1 discloses a method and a device for measuring the ground contact characteristics of a tire, through which the ground contact characteristics of each portion of a tread surface of a tire are obtained. In the technique disclosed in Patent Document 1, a tire as an object to be measured, to which a required camber angle and a required slip angle are given, is brought in contact with a rotary drum in which a three-component force sensor capable of measuring ground contact pressure, shear stress in a width direction, and shear stress in a circumferential direction of a tire is embedded and which can be rotationally driven. Further, the rotary drum and the tire are rotated together and the tire passes over the three-component force sensor plural times, such that the three-component force sensor measures the ground contact pressure, the shear stress in the width direction, and the shear stress in the circumferential direction of the tire plural times. Furthermore, the position of each measurement point in the circumferential direction of the tire is specified. In addition, while the tire is displaced in the direction of an axis of rotation of the rotary drum, the ground contact pressure, the shear stress in the width direction, and the shear stress in the circumferential direction of the tire are repeatedly measured and the positions of measurement points in the circumferential direction of the tire are repeatedly specified. As a result, a ground contact pressure distribution, a shear stress distribution in the width direction, and a shear stress distribution in the circumferential direction in a contact region, which is a region where the tire is in contact with the rotary drum, are obtained.

In the technique disclosed in Patent Document 1, a camber angle and a slip angle to be given are maintained at constant values from the start to the end of the measurement that is performed to obtain the ground contact pressure, the shear stress in the width direction, and the shear stress in the circumferential direction of the tire at a predetermined point in time. For this reason, tire ground contact characteristics (a grip force distribution, a shear stress distribution in the width direction, and a shear stress distribution in the circumferential direction) corresponding to the tire attitude of an actual vehicle at each point in time during a period where a transient change in a tire attitude during the travel of the actual vehicle occurs (for example, during a period from the start to the end of the change of a lane) cannot be obtained by the technique disclosed in Patent Document 1.

CITATION LIST

Patent Document

[Patent Document 1]
Japanese Unexamined Patent Application, First Publication No. 2014-021012

SUMMARY OF INVENTION

Technical Problem

The present invention has been made in consideration of the above-mentioned circumstances, and an object of the present invention is to provide a tire ground contact characteristic measuring method, a tire ground contact characteristic measuring portion, and a tire ground contact characteristic measuring system that can obtain tire ground contact characteristics corresponding to the tire attitude of an actual vehicle at each point in time during a period where a transient change in a tire attitude during the travel of the actual vehicle occurs.

Solution to Problem

A tire ground contact characteristic measuring method according to an aspect of the present invention includes: a reproduction step of reproducing a transient change in a tire attitude that occurs during travel of an actual vehicle on a tire; a stress measurement step of causing a stress measuring portion embedded on a rotatable rotary drum to measure stress that is applied to the tire in contact with the rotary drum that is rotationally driven; and a calculation step of calculating tire ground contact characteristics, which are characteristics of a ground contact region of a tread surface of the tire in contact with the rotary drum, on the basis of the stress measured by the stress measuring portion. The tire ground contact characteristics calculated in the calculation step are tire ground contact characteristics of the tire corresponding to the tire attitude of the actual vehicle at each point in time during a period where the transient change occurs.

Advantageous Effects of Invention

According to the present invention, it is possible to provide a tire ground contact characteristic measuring method, a tire ground contact characteristic measuring portion, and a tire ground contact characteristic measuring system through which tire ground contact characteristics corresponding to a tire attitude of an actual vehicle at each point in time during a period where a transient change in the tire attitude during the travel of the actual vehicle occurs can be obtained.

In the present invention, the ground contact characteristics of the tire are measured values obtained from sensors, various stresses calculated from the measured values, wear energy, slippage, and the like, and include a grip force distribution, various stress distributions, a slip distribution, and the like.

A motion state and vehicle characteristics can include various parameters represented by the position of a vehicle, a steering angle, moments around a pitch axis, a roll axis, and a yaw axis, the speed of a vehicle, the inertia parameter of a vehicle, a grip force, the axial force of a tire, and the like; and the axial force of a tire can include at least six component forces acting on the axis of rotation of a tire. The six component forces are forces that act on the fixed axis of a tire in an X-axis direction, a Y-axis direction, and a Z-axis direction, a moment acting around an X axis, a moment acting around a Y axis, and a moment acting around a Z axis.

Further, a command transmitted to an electronic control unit and based on the predicted vehicle characteristics includes a wheel speed, a yaw rate, vehicle acceleration, and acceleration acting on an axis of a tire, and simulation signals substituting for various sensors mounted on a vehicle, such as, a front radar and a camera.

BRIEF DESCRIPTION OF DRAWINGS

FIG. 3 is a diagram showing a ground contact region of a tread surface of the tire that is in contact with a rotary drum, and the like.

FIG. 4 is a diagram showing an example of tire ground contact characteristics that are calculated by a processing portion of a tire ground contact characteristic measuring portion according to a second embodiment.

FIG. 6 is a diagram showing an example of a transient change in a tire attitude occurring during the travel of an actual vehicle that is reproduced on the tire by the tire ground contact characteristic measuring portion according to the second embodiment, and the like.

FIG. 7 is a diagram in which the position of the rotary drum at the time of start of measurement is shifted by an angle of 180° and measurement positions are added to the example shown in FIG. 6.

FIG. 8 is a diagram showing a case where measurement points are further added to the example shown in FIG. 7.

DESCRIPTION OF EMBODIMENTS

Embodiments of a tire ground contact characteristic measuring method, a tire ground contact characteristic measuring portion, and a tire ground contact characteristic measuring system according to the present invention will be described below with reference to the drawings.

First Embodiment

Figure 1:
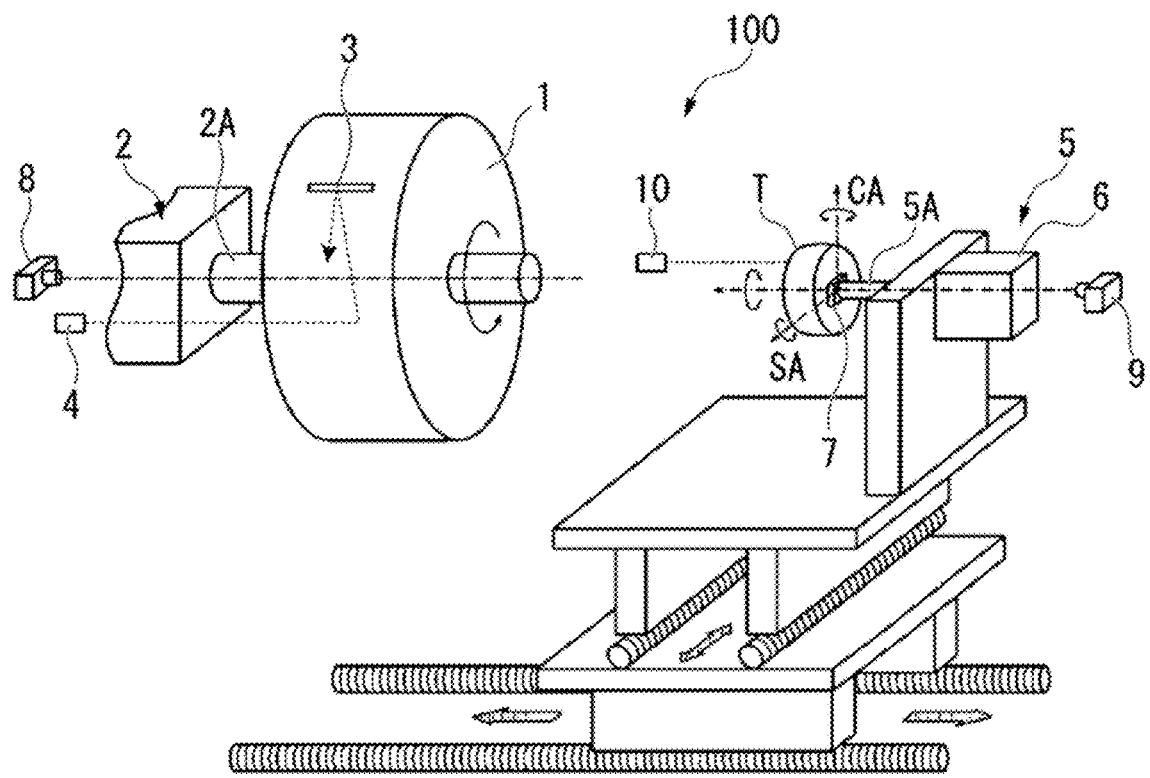
FIG. 1 is a diagram showing the configuration of an example of a tire ground contact characteristic measuring portion according to a first embodiment.
Figure 2:
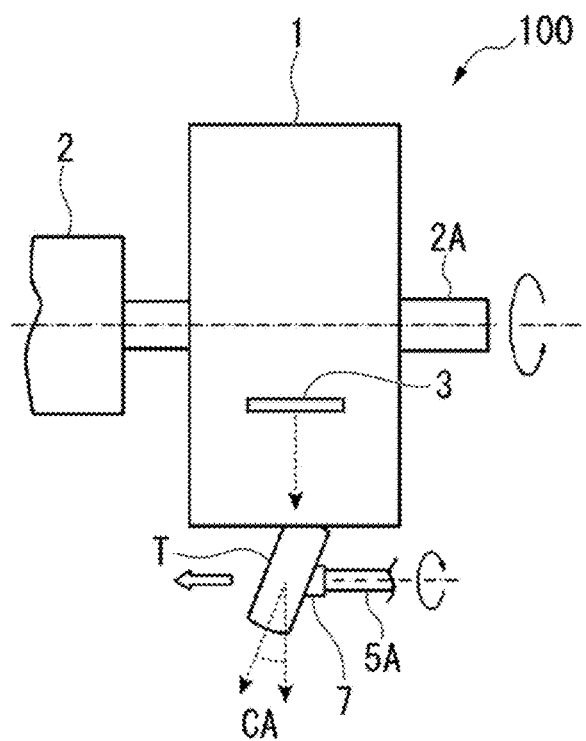
FIG. 2 is a diagram showing a camber angle and the like to be given to a tire.
Figure 3:
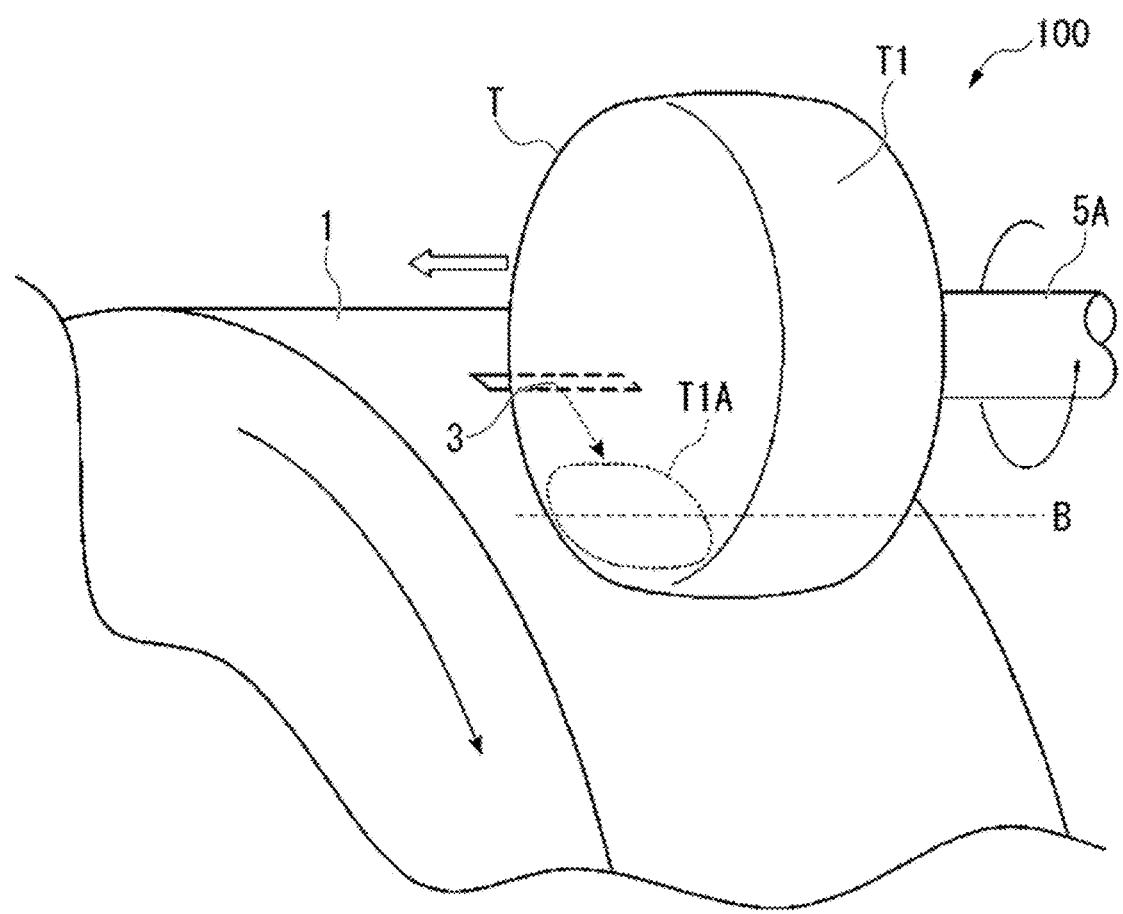

FIG. 1 is a diagram showing the configuration of an example of a tire ground contact characteristic measuring portion 100 according to a first embodiment. FIG. 2 is a diagram showing a camber angle CA and the like to be given to a tire T. FIG. 3 is a diagram showing a ground contact region T1A of a tread surface T1 of the tire T that is in contact with a rotary drum 1, and the like.

In the example shown in FIGS. 1 to 3, the tire ground contact characteristic measuring portion 100 according to the first embodiment measures the ground contact characteristics of the tire T. The tire ground contact characteristic measuring portion 100 includes a rotary drum 1, a drum driving portion 2, a stress measuring portion 3, a processing portion 4, a tire position control portion 5, a tire driving portion 6, a tire angle control portion 7, and a tire pressure changing portion 10.

The rotary drum 1 is a substantially cylindrical drum that is adapted to be rotatable. As shown in FIGS. 2 and 3, the tread surface T1 of the tire T is in contact with the outer circumferential surface of the rotary drum 1.

The drum driving portion 2 is, for example, a motor or the like that rotationally drives the rotary drum 1. The drum driving portion 2 includes a drum shaft 2A. The drum shaft 2A is connected to the rotary drum 1. The drum driving portion 2 can rotationally drive the rotary drum 1 in both a normal direction and a reverse direction, and can adjust the rotational speed of the rotary drum 1.

The rotary drum 1 is a type of outside drum in the example shown in FIGS. 1 to 3, but the rotary drum 1 may be a type of inside drum in other examples.

In the example shown in FIGS. 1 to 3, the stress measuring portion 3 is embedded on the rotary drum 1 and measures stress applied to the tire T that is in contact with the rotary drum 1. The stress measuring portion 3 is, for example, a three-component force sensor that can measure a grip force, shear stress in a width direction, and shear stress in a circumferential direction applied to the tire T.

The stress measuring portion 3 is a three-component force sensor in the example shown in FIGS. 1 to 3. However, in other examples, the stress measuring portion 3 may be a combination of a sensor that measures a grip force and a two-axis sensor that measures shear stress in the width direction and shear stress in the circumferential direction.

In the example shown in FIGS. 1 to 3, the processing portion 4 calculates tire ground contact characteristics, which are the characteristics of the ground contact region T1A (see FIG. 3) of the tread surface T1 of the tire T in contact with the rotary drum 1, on the basis of the stress measured by the stress measuring portion 3. In detail, the processing portion 4 calculates a grip force distribution, a shear stress distribution in the width direction, a shear stress distribution in the circumferential direction, and the like in the ground contact region T1A as the tire ground contact characteristics.

The processing portion 4 is, for example, a microcomputer that includes a central processing portion (CPU), a memory, and the like. A data analysis program, which is used to analyze measurement results, is stored in the memory of the processing portion 4. For example, a general-purpose numerical analysis program can be used as the data analysis program.

The processing portion 4 can visualize the calculated grip force distribution, the calculated shear stress distribution in the width direction, the calculated shear stress distribution in the circumferential direction, and the like in the ground contact region T1A to display the calculated distributions and the like on a monitor (not shown); and can simulate the behavior of a vehicle by reflecting the ground contact characteristics of the tire in a vehicle model.

The processing portion 4 is provided with the above-mentioned data analysis program in the example shown in FIGS. 1 to 3, but the processing portion 4 may be provided with a data analysis program different from the above-mentioned data analysis program in other examples.

In the example shown in FIGS. 1 to 3, the tire position control portion 5 controls the position of the tire T with respect to the rotary drum 1. In detail, the tire position control portion 5 can adjust the position of the tire T with respect to the rotary drum 1 in the direction of the axis of rotation and/or the radial direction of the rotary drum 1.

The tire position control portion 5 adjusts the position of the tire T with respect to the rotary drum 1 in the example shown in FIGS. 1 to 3, but may adjust the position of the rotary drum 1 with respect to the tire T in other examples.

In the example shown in FIGS. 1 to 3, the tire position control portion 5 includes a spindle shaft 5A connected to the tire T, the tire driving portion 6, and the tire angle control portion 7.

The tire driving portion 6 is, for example, a motor or the like that rotationally drives the tire T. The tire driving portion 6 can rotationally drive the tire T in both a normal direction and a reverse direction, and can adjust the rotational speed of the tire T.

The tire angle control portion 7 controls the angle of the tire T with respect to the rotary drum 1. In detail, the tire angle control portion 7 can give a camber angle CA to the tire T. Further, the tire angle control portion 7 can give a slip angle SA to the tire T. Furthermore, the tire angle control portion 7 can give a grip force to the tire T by bringing the tire T in contact with the rotary drum 1. That is, the tire angle control portion 7 can reproduce a tire attitude obtained at the time of cornering or the like of an actual vehicle on the tire T by adjusting the camber angle CA, the slip angle SA, and/or the grip force of the tire T.

The tire angle control portion 7 can also adjust any one or both of the camber angle CA and the slip angle SA to be given to the tire T to 0°. In a case where both of the camber angle CA and the slip angle SA to be given to the tire T are adjusted to 0°, a tire attitude obtained in a case where the actual vehicle travels straight is reproduced on the tire T.

Figure 13:
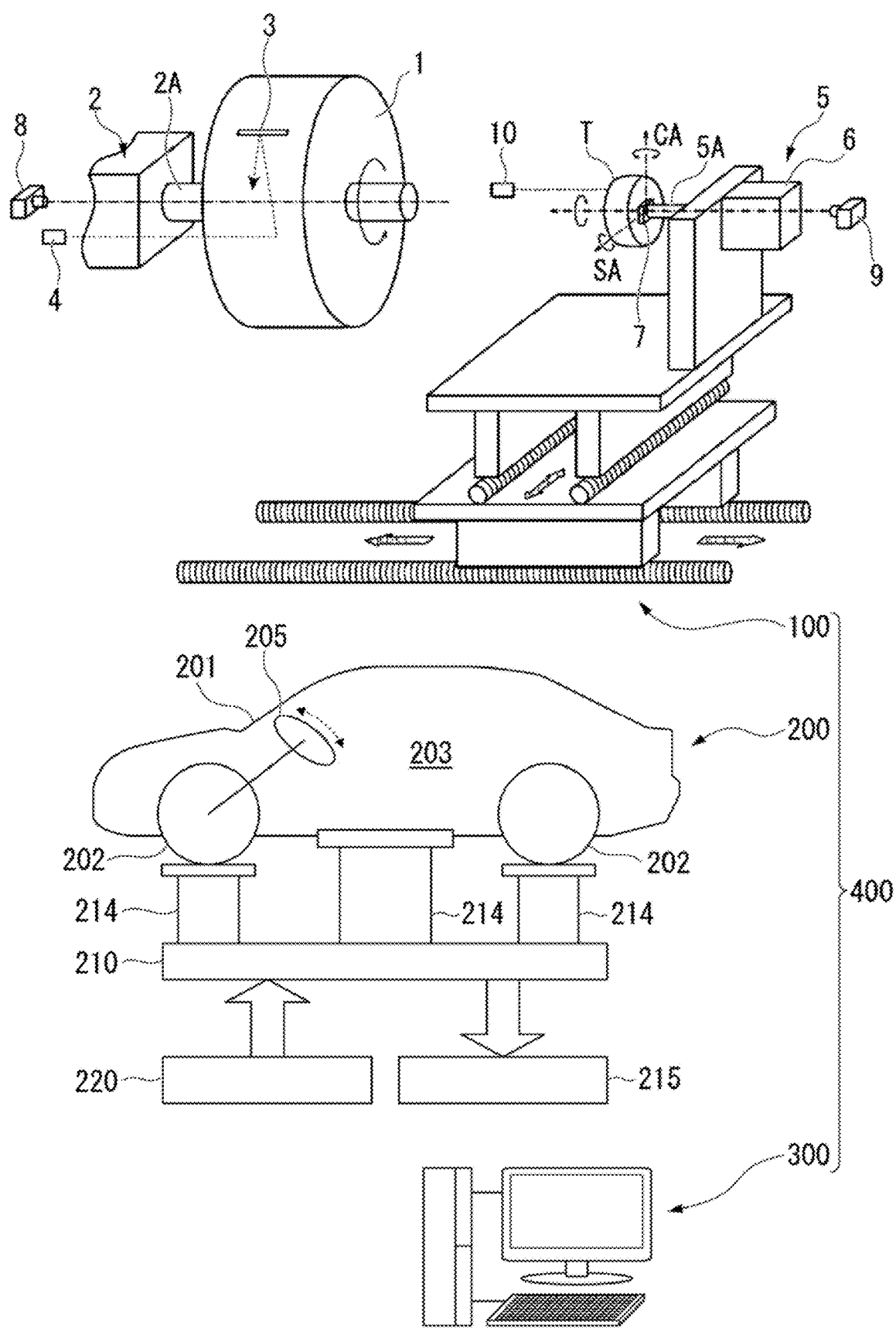
FIG. 13 is a diagram showing the configuration of an example of a tire ground contact characteristic measuring system according to a third embodiment.

By reflecting the ground contact characteristics of the tire obtained as described above in a simulator (i.e., for example, a vehicle behavior simulation portion 300 shown in FIG. 13), it is possible to more accurately reproduce the behavior of the actual vehicle.

Figure 9:
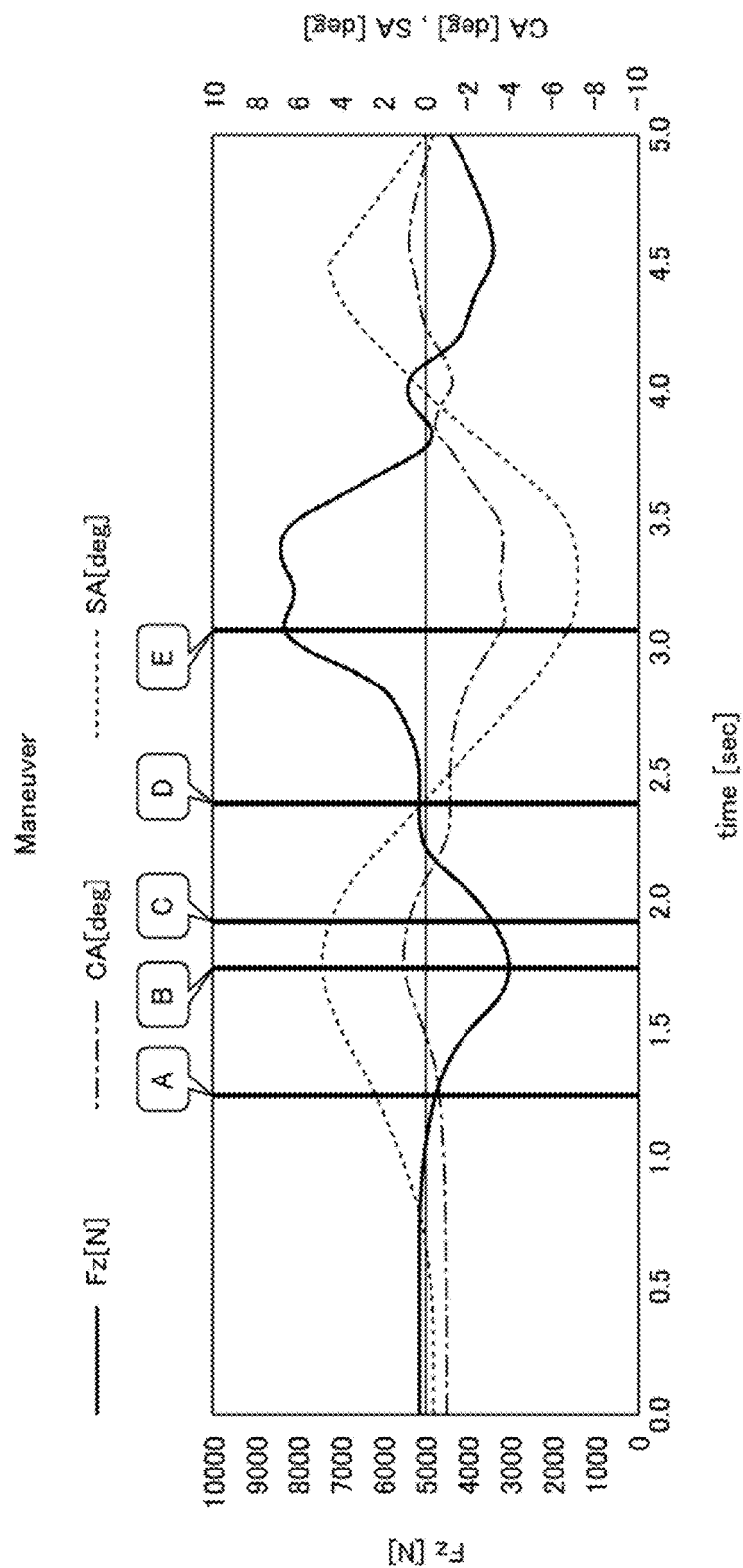
FIG. 9 is a diagram showing the temporal changes of a grip force Fz [N], a camber angle CA [deg], and a slip angle SA [deg] to be given to the tire by a tire angle control portion of the tire ground contact characteristic measuring portion according to the second embodiment.

Through diligent research, the inventor has reproduced a transient change in the tire attitude of the actual vehicle that occurs in a case where the change of a lane shown in a portion (B) of FIG. 6 is performed during a period shown in FIG. 9 on the tire T shown in FIGS. 1 to 3 by the tire ground contact characteristic measuring portion 100 according to the first embodiment.

Through diligent research, the inventor has found that tire ground contact characteristics at times A, B, C, D, and E (see FIG. 9) calculated by the processing portion 4 of the tire ground contact characteristic measuring portion 100 according to the first embodiment were different from tire ground contact characteristics at times A, B, C, D, and E calculated by a conventional tire ground contact characteristic measuring portion.

Figure 10:
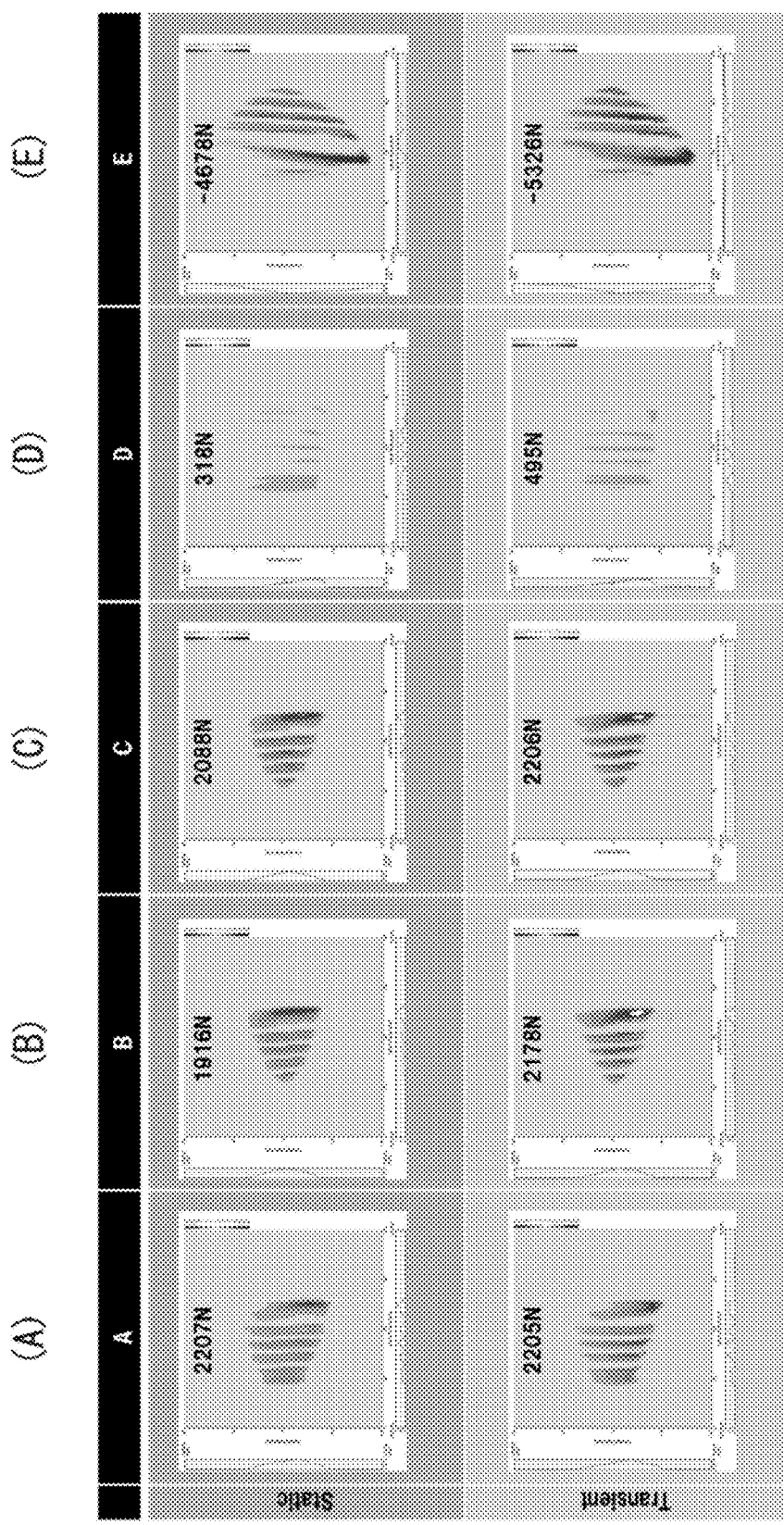
FIG. 10 is a diagram showing a difference between a shear stress distribution in a width direction that is calculated by a processing portion of the tire ground contact characteristic measuring portion according to the first embodiment and a shear stress distribution in a width direction that is calculated by a conventional tire ground contact characteristic measuring portion as a comparative example.

FIG. 10 is a diagram showing a difference between the shear stress distribution in the width direction that is calculated by the processing portion 4 of the tire ground contact characteristic measuring portion 100 according to the first embodiment and the shear stress distribution in the width direction that is calculated by the conventional tire ground contact characteristic measuring portion as a comparative example.

In detail, a shear stress distribution in the width direction at a time A that is calculated by the conventional tire ground contact characteristic measuring portion is shown on the upper side in a portion (A) of FIG. 10, and a shear stress distribution in the width direction at the time A that is calculated by the processing portion 4 of the tire ground contact characteristic measuring portion 100 according to the first embodiment is shown on the lower side in the portion (A) of FIG. 10.

In the tire ground contact characteristic measuring portion 100 according to the first embodiment, the drum driving portion 2, the tire position control portion 5, the tire driving portion 6, and the tire angle control portion 7 operated during a period from a time t10 to a time t70 in order to reproduce a transient change in the tire attitude of the actual vehicle occurring during the change of a lane shown in the portion (B) of FIG. 6 on the tire T. Further, the processing portion 4 calculated a shear stress distribution in the width direction corresponding to a transient tire attitude where the behavior of the actual vehicle occurring at the time A during the period (the time t10 to the time t70) where a transient change occurs was reproduced.

On the other hand, in the conventional tire ground contact characteristic measuring portion serving as the comparative example, the processing portion 4 calculated a shear stress distribution in the width direction at the time A with a grip force Fz [N], a camber angle CA [deg], and a slip angle SA [deg] to be given to the tire T by the tire angle control portion 7 being maintained at values obtained at a point of the time A.

Likewise, the processing portion 4 also calculated a shear stress distribution in the width direction corresponding to a transient tire attitude where the behavior of the actual vehicle occurring at each of the times B, C, D, and E was reproduced (first embodiment) and a shear stress distribution in the width direction corresponding to a fixed tire attitude obtained at each time (comparative example).

As shown in FIG. 10, the shear stress distributions in the width direction at the times A, B, C, D, and E that were calculated by the processing portion 4 of the tire ground contact characteristic measuring portion 100 according to the first embodiment were different from the shear stress distributions in the width direction at the times A, B, C, D, and E that were calculated by the conventional tire ground contact characteristic measuring portion as the comparative example.

Figure 11:
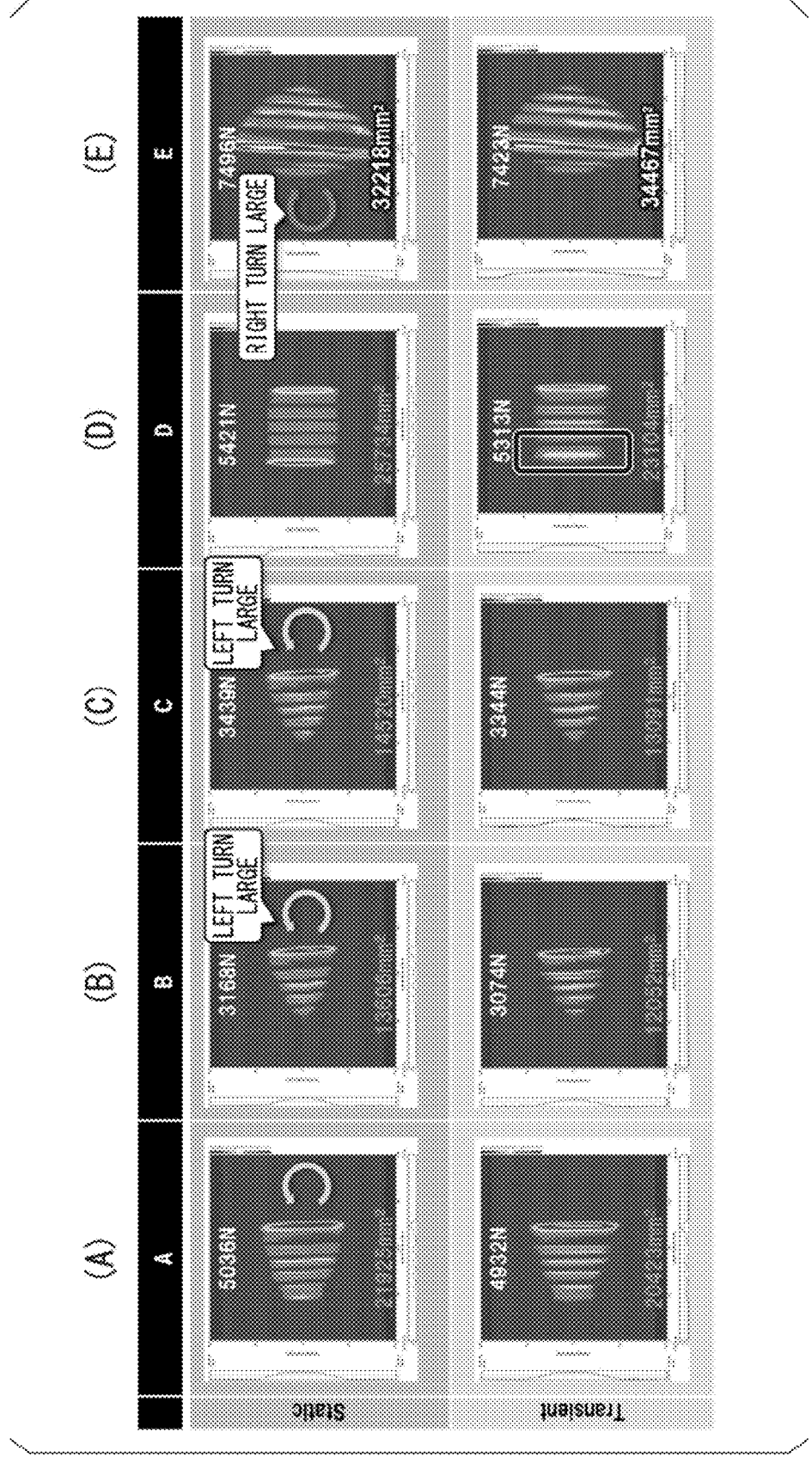
FIG. 11 is a diagram showing a difference between a grip force distribution that is calculated by the processing portion of the tire ground contact characteristic measuring portion according to the first embodiment and a grip force distribution that is calculated by the conventional tire ground contact characteristic measuring portion as the comparative example.

FIG. 11 is a diagram showing a difference between a grip force distribution that was calculated by the processing portion 4 of the tire ground contact characteristic measuring portion 100 according to the first embodiment and a grip force distribution that was calculated by the conventional tire ground contact characteristic measuring portion as the comparative example.

In detail, a grip force distribution at the time A that was calculated by the conventional tire ground contact characteristic measuring portion is shown on the upper side in a portion (A) of FIG. 11, and a grip force distribution at the time A that was calculated by the processing portion 4 of the tire ground contact characteristic measuring portion 100 according to the first embodiment is shown on the lower side in the portion (A) of FIG. 11.

As with the above-mentioned shear stress distribution in the width direction, the processing portion 4 also calculated a grip force distribution corresponding to a transient tire attitude where the behavior of the actual vehicle occurring at each of the times B, C, D, and E was reproduced (first embodiment) and a grip force distribution corresponding to a static tire attitude obtained at each time (comparative example). As shown in FIG. 11, the grip force distribution (ground contact area) at each time that was calculated by the processing portion 4 of the tire ground contact characteristic measuring portion 100 according to the first embodiment was different from the grip force distribution (ground contact area) at each time that was calculated by the conventional tire ground contact characteristic measuring portion as the comparative example.

Figure 12:
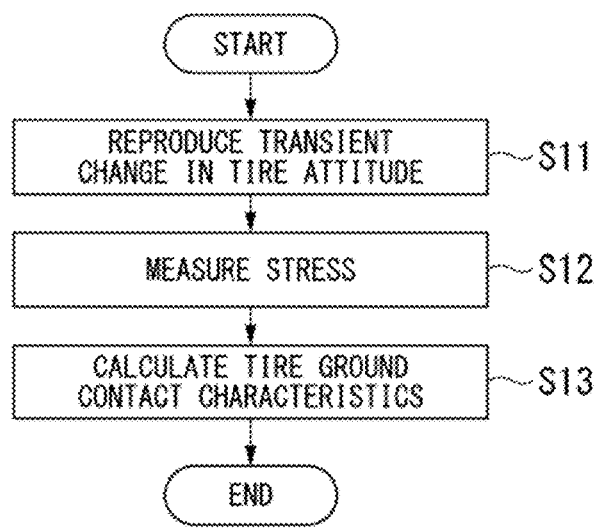
FIG. 12 is a flowchart showing an example of processing performed in the tire ground contact characteristic measuring portion 100 according to the first embodiment.

FIG. 12 is a flowchart showing an example of processing performed in the tire ground contact characteristic measuring portion 100 according to the first embodiment.

In the example shown in FIG. 12, in Step S11, the processing portion 4 reproduces a transient change in a tire attitude that occurs during the travel of the actual vehicle on the tire T. A transient change in a tire attitude may be input from a driving simulator (i.e., for example, a vehicle behavior simulation portion 300 shown in FIG. 13) modeled from the actual vehicle, or tire ground contact characteristics may be reflected in the driving simulator to reproduce a behavior close to the behavior of the actual vehicle on the driving simulator so that a more accurate tire attitude can be obtained.

In detail, in Step S11, the rotational speed of the rotary drum 1 is adjusted by the drum driving portion 2. Further, the position of the tire T with respect to the rotary drum 1 is adjusted in the direction of the axis of rotation and/or the radial direction of the rotary drum 1 by the tire position control portion 5. Furthermore, the rotational speed of the tire T is adjusted by the tire driving portion 6. Moreover, the camber angle, the slip angle, and/or the grip force of the tire T is adjusted by the tire angle control portion 7. Further, the air pressure of the tire T is adjusted by the tire pressure changing portion 10.

Then, in Step S12, the stress measuring portion 3 measures stress applied to the tire T that is in contact with the rotary drum 1. In detail, the stress measuring portion 3 measures a grip force, shear stress in the width direction, shear stress in the circumferential direction, and the like applied to the tire T.

In detail, in Step S12, the drum driving portion 2 rotationally drives the rotary drum 1 and the tire driving portion 6 rotationally drives the tire T to bring the stress measuring portion 3 into contact with a plurality of points arranged on the tread surface T1 of the tire T in the circumferential direction. The stress measuring portion 3 measures stress that is applied to the tire T at a plurality of points arranged on the tread surface T1 of the tire T in the circumferential direction.

After that, in Step S13, the processing portion 4 calculates tire ground contact characteristics, which are the characteristics of the ground contact region T1A of the tread surface T1 of the tire T in contact with the rotary drum 1, on the basis of the stress measured by the stress measuring portion 3.

The tire ground contact characteristics calculated in Step S13 are the tire ground contact characteristics of the tire T corresponding to the tire attitude of the actual vehicle at each point in time (for example, the times A, B, and the like) during a period where a transient change in a tire attitude during the travel of the actual vehicle occurs.

In other words, in an actual vehicle test, it is difficult to control changes in environmental conditions, such as the condition or temperature of a road surface, an atmospheric temperature, and an atmospheric pressure, and costs, effort and time are required. However, in a case where Steps S11 to S13 of the first embodiment are repeated, a transient tire force, which could not be measured in a conventional drum test, can be measured through a transient change in the attitude angle of the tire in the tire ground contact characteristic measuring portion 100. For this reason, the evaluation of the tire during the travel of the actual vehicle can be dynamically (transitionally) performed in the tire ground contact characteristic measuring portion 100 according to the first embodiment.

The processing portion 4 of the tire ground contact characteristic measuring portion 100 according to the first embodiment can calculate a friction coefficient $\mu$ and the like at an arbitrary position in the ground contact region T1A of the tire T and can also obtain the distribution of a friction coefficient $\mu$, that is, a slip distribution in the ground contact region T1A of the tire T, by associating the measurement results of the stress measuring portion 3 with each other.

Further, in a case where a plurality of measurement results are obtained at the same position on the tire T because the stress measuring portion 3 faces the same position in the ground contact region T1A of the tire T, for example, during measurement in the tire ground contact characteristic measuring portion 100 according to the first embodiment, an average of these measurement results is used as a measurement result.

Second Embodiment

The tire angle control portion 7 and a drum-side rotational position detecting portion 8 are added to the tire ground contact characteristic measuring portion 100 according to the first embodiment, and the ground contact characteristics of a tire can be measured in a specific ground contact region T1A of the tread surface T1 of the tire T. The ground contact characteristic of a tire, in which a tread pattern is reflected in detail, can be measured, unlike in the first embodiment. In the example shown in FIGS. 1 to 3, the drum-side rotational position detecting portion 8 detects the rotational position of the rotary drum 1. In detail, the drum-side rotational position detecting portion 8 detects the rotational position of the stress measuring portion 3 embedded on the rotary drum 1.

In the example shown in FIGS. 1 to 3, a position directly under a load where the rotary drum 1 and the tire T are in contact with each other is set as a reference position B (see FIG. 3). The drum-side rotational position detecting portion 8 detects the rotational position of the stress measuring portion 3 with respect to the reference position B.

The drum-side rotational position detecting portion 8 is, for example, a rotary encoder or the like that is disposed on the drum shaft 2A of the drum driving portion 2.

In the example shown in FIGS. 1 to 3, a tire-side rotational position detecting portion 9 detects the rotational position of the tire T. In detail, the tire-side rotational position detecting portion 9 detects the rotational position of the tire T with respect to the reference position B. The tire-side rotational position detecting portion 9 is, for example, a rotary encoder or the like that is disposed on the spindle shaft 5A of the tire position control portion 5.

The rotational position of the stress measuring portion 3 with respect to the reference position B that is detected by the drum-side rotational position detecting portion 8 and the rotational position of the tire T with respect to the reference position B that is detected by the tire-side rotational position detecting portion 9 are input to the processing portion 4. The processing portion 4 calculates a position in the circumferential direction on the tire T where the stress measuring portion 3 is in contact with the tire T on the basis of the rotational position of the stress measuring portion 3 with respect to the reference position B and the rotational position of the tire T with respect to the reference position B.

In the example shown in FIGS. 1 to 3, the tire pressure changing portion 10 has, for example, a function to change the air pressure of the tire T during a period where the tire angle control portion 7 changes the camber angle, the slip angle, and/or the grip force of the tire T, or the like and can grasp the behavior and the like of the actual vehicle at the time of occurrence of so-called puncture.

FIG. 4 is a diagram showing examples of tire ground contact characteristics (the characteristics of the ground contact region T1A of the tread surface T1 of the tire T in contact with the rotary drum 1) that were calculated by a processing portion 4 of a tire ground contact characteristic measuring portion 100 according to a second embodiment. In detail, FIG. 4 is a diagram showing an example of tire ground contact characteristics calculated and visualized by the processing portion 4.

Horizontal axes of portions (A) and (B) of FIG. 4 represent the width direction of the tire T, and vertical axes of the portions (A) and (B) of FIG. 4 represent the circumferential direction of the tire T. An upper side in the portions (A) and (B) of FIG. 4 represents the trailing side of the tire T, and a lower side in the portions (A) and (B) of FIG. 4 represents the leading side of the tire T.

In the example shown in the portion (A) of FIG. 4, a tire attitude obtained in a case where the actual vehicle travels straight is reproduced on the tire T by the tire angle control portion 7 and a grip force distribution in the ground contact region T1A at that time is shown. In the example shown in the portion (A) of FIG. 4, the speed of the actual vehicle is set to 60 [kph] and a slip angle SA is set to 0 [°]. In the example shown in the portion (A) of FIG. 4, a grip force at a position directly under a load in the ground contact region T1A where the rotary drum 1 and the tire T are in contact with each other is larger than grip forces at other positions.

In the example shown in the portion (B) of FIG. 4, a tire attitude obtained at the time of cornering of the actual vehicle is reproduced on the tire T by the tire angle control portion 7 and a grip force distribution in the ground contact region T1A at that time is shown. In the example shown in the portion (B) of FIG. 4, the speed of the actual vehicle is set to 60 [kph] and a slip angle SA is set to 6 [°]. In the example shown in the portion (B) of FIG. 4, a grip force on the outside of the corner (the left side in the portion (B) of FIG. 4) in the ground contact region T1A is larger than a grip force on the inside of the corner (the right side in the portion (B) of FIG. 4).

Figure 5:
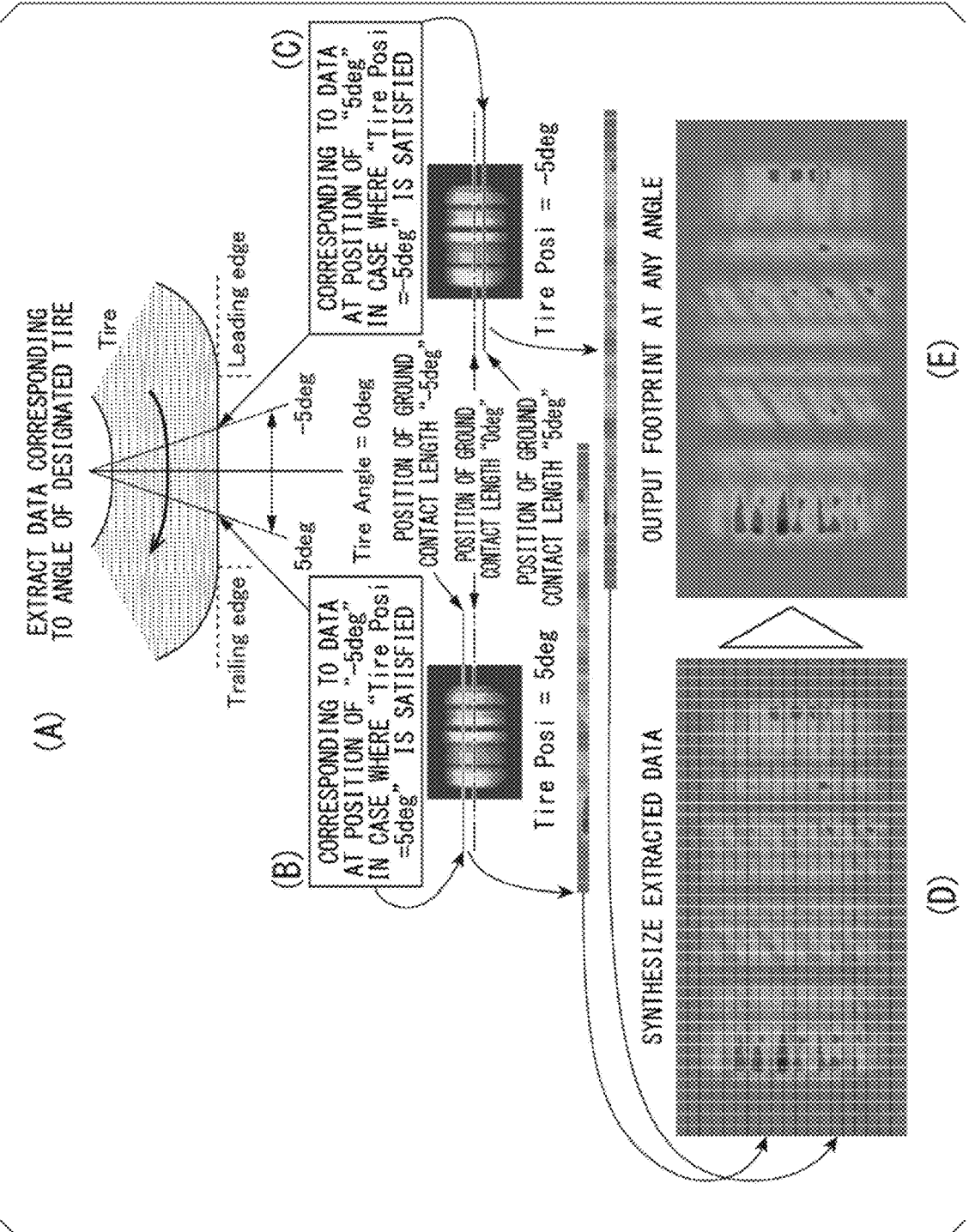
FIG. 5 is a diagram showing an example of a method in which the tire ground contact characteristics shown in FIG. 4 are calculated by the processing portion of the tire ground contact characteristic measuring portion according to the second embodiment.

FIG. 5 is a diagram showing an example of a method in which the tire ground contact characteristics shown in FIG. 4 are calculated by the processing portion 4 of the tire ground contact characteristic measuring portion 100 according to the second embodiment.

In detail, a portion (A) of FIG. 5 is a diagram showing a leading edge and a trailing edge of the ground contact region T1A of the tread surface T1 of the tire T. A portion (B) of FIG. 5 is a diagram conceptually showing stress at a position of "5 deg" measured by the stress measuring portion 3 in a case where the tread surface T1 of the tire T was in contact with the stress measuring portion 3 at the position of "5 deg" in the circumferential direction. A portion (C) of FIG. 5 is a diagram conceptually showing stress at a position of "−5 deg" measured by the stress measuring portion 3 in a case where the tread surface T1 of the tire T was in contact with the stress measuring portion 3 at the position of "−5 deg" in the circumferential direction. A portion (D) of FIG. 5 is a diagram conceptually showing processing for synthesizing stress data at a plurality of positions in the circumferential direction on the tread surface T1 of the tire T that are measured by the stress measuring portion 3. A portion € of FIG. 5 is a diagram showing an example of a grip force distribution of the ground contact region T1A that is visualized by the processing portion 4.

In the example shown in FIG. 5, the processing portion 4 records a position on the tread surface T1 of the tire T where the tire T stepped on the stress measuring portion 3 (i.e., a position in the circumferential direction on the tire T where the tire T was in contact with the stress measuring portion 3). The stress measuring portion 3 is not only in contact with the tread surface T1 of the tire T at the reference position B (i.e., a position directly under a load) but is also in contact with the tread surface T1 of the tire T at a position other than the reference position B. That is, the stress measuring portion 3 remains in contact with the tread surface T1 of the tire T during a period until the stress measuring portion 3 comes into contact with the trailing edge of the ground contact region T1A after the stress measuring portion 3 coming into contact with the leading edge of the ground contact region T1A. For this reason, the stress measuring portion 3 can acquire a change in stress from the leading edge to the trailing edge.

In detail, not only is stress at a position of "Tire Angle=0 deg" (see the portion (A) of FIG. 5) measured by the stress measuring portion 3 but stress at a position of "Tire Posi=5 deg" (see the portion (B) of FIG. 5) corresponding to a position of "5 deg" in the portion (A) of FIG. 5 is also measured by the stress measuring portion 3. Further, stress at a position of "Tire Posi=−5 deg" (see the portion (C) of FIG. 5) corresponding to a position of "−5 deg" in the portion (A) of FIG. 5 is also measured by the stress measuring portion 3.

Furthermore, stress at all positions in the circumferential direction on the tread surface T1 of the tire T is measured by the stress measuring portion 3. The processing portion 4 continues to make a record until the tread surface T1 of the tire T comes into contact with the stress measuring portion 3 at all positions in the circumferential direction in a series of traveling behaviors.

In detail, stress measuring portion 3 can also be disposed to cover the entire circumference of the rotary drum 1. However, in order to bring the tread surface T1 of the tire T in contact with the stress measuring portion 3 at all ground contact positions during a period where a transient change occurs, for example, a braking force can also be given to the tire T. Accordingly, since the circumferential speed of the tire T and the circumferential speed of the rotary drum 1 can be made different from each other, all positions in the circumferential direction on the tread surface T1 of the tire T can also be caused to face the stress measuring portion 3. Regardless of what method is used to measure stress, stress can be more efficiently measured in a case where the stress measuring portion 3 is disposed in the width direction of the drum 1 at a plurality of ground contact points of the drum 1. In a case where a plurality of sensors, which are installed in a line in the width direction, are installed to alternate in a plurality of lines, measurement time can be shortened and the resolution of the stress distributions and the like can be improved. Further, it is possible to simplify a measuring portion itself by reducing the number of positions where the stress measuring portion 3 is disposed.

FIG. 6 is a diagram showing an example of a transient change in a tire attitude occurring during the travel of the actual vehicle that is reproduced on the tire T by the tire ground contact characteristic measuring portion 100 according to the second embodiment, and the like.

In detail, a portion (A) of FIG. 6 is a diagram showing the temporal changes of a grip force Fz [N], a camber angle CA [deg], and a slip angle SA [deg] to be given to the tire T by the tire angle control portion 7 of the tire ground contact characteristic measuring portion 100 according to the second embodiment. In the portion (A) of FIG. 6, a horizontal axis represents time [sec] and a vertical axis represents a grip force Fz [N], a camber angle CA [deg], and a slip angle SA [deg].

A portion (B) of FIG. 6 shows the traveling states of the actual vehicle corresponding to the temporal changes of a grip force Fz [N], a camber angle CA [deg], and a slip angle SA [deg] shown in the portion (A) of FIG. 6.

In the example shown in FIG. 6, the actual vehicle changes a lane to a right lane from a left lane in the portion (B) of FIG. 6 in five seconds from 0 [sec] (time t10) to 5 [sec] (time t70) shown on the horizontal axis of the portion (A) of FIG. 6.

That is, in the example shown in FIG. 6, in order to reproduce a transient change in the tire attitude of the actual vehicle occurring during the change of a lane shown in the portion (B) of FIG. 6 on the tire T, the tire angle control portion 7 changes a grip force Fz [N], a camber angle CA [deg], and a slip angle SA [deg] to be given to the tire T with the passage of time as shown in the portion (A) of FIG. 6. That is, the tire angle control portion 7 reproduces a transient change in a tire attitude that occurs during the travel of the actual vehicle by changing the camber angle CA [deg], the slip angle SA [deg], and/or the grip force Fz [N] of the tire T.

In detail, a measuring method in a case where one stress measuring portion 3 is disposed in the width direction on the peripheral surface of the rotary drum 1 is exemplified in the example shown in FIG. 6. In order to measure the stress of the tread surface T1 of the tire T at a time t10, a time t30, a time t50, and a time t70 by the stress measuring portion 3, the stress measuring portion 3 is disposed at the reference position B (a position directly under a load) at the time t10. Then, the rotary drum 1 makes one rotation and the stress measuring portion 3 is positioned at the reference position B at the time t30. After that, the rotary drum 1 makes one rotation and the stress measuring portion 3 is positioned at the reference position B at the time t50. Then, the rotary drum 1 makes one rotation and the stress measuring portion 3 is positioned at the reference position B at the time t70. As a result, the stress of the tread surface T1 of the tire T at the time t10, the time t30, the time t50, and the time t70 can be measured by the stress measuring portion 3.

FIG. 7 is a diagram in which the position of the rotary drum 1 at the time of start of measurement was shifted by an angle of 180° and measurement positions were added to the example shown in FIG. 6. In detail, as in the portion (A) of FIG. 6, a portion (A) of FIG. 7 shows the temporal changes of a grip force Fz [N], a camber angle CA [deg], and a slip angle SA [deg] to be given to the tire T by the tire angle control portion 7 of the tire ground contact characteristic measuring portion 100 according to the first embodiment. As in the portion (B) of FIG. 6, a portion (B) of FIG. 7 shows the traveling states of the actual vehicle corresponding to the temporal changes of a grip force Fz [N], a camber angle CA [deg], and a slip angle SA [deg] shown in the portion (A) of FIG. 7.

In FIG. 7, a time t20 is a time when the rotary drum 1 was rotated from the state of the time t10 by an angle of 180°. A time t40 is a time when the rotary drum 1 was rotated from the state of the time t30 by an angle of 180°. A time t60 is a time when the rotary drum 1 was rotated from the state of the time t50 by an angle of 180°.

In the example shown in FIG. 7, in order to measure the stress of the tread surface T1 of the tire T at the time t20, the time t40, and the time t60 by the stress measuring portion 3, the stress measuring portion 3 is disposed on a position on the rotary drum 1 which is opposite from the reference position B (i.e., a position directly under a load) across the center of the rotary drum 1 at the time t10. Then, the rotary drum 1 makes a half rotation and the stress measuring portion 3 is positioned at the reference position B at the time t20. After that, the rotary drum 1 makes one rotation and the stress measuring portion 3 is positioned at the reference position B at the time t40. Then, the rotary drum 1 makes one rotation and the stress measuring portion 3 is positioned at the reference position B at the time t60. As a result, the stress of the tread surface T1 of the tire T at the time t20, the time t40, and the time t60 can be measured by the stress measuring portion 3.

FIG. 8 is a diagram showing a case where measurement points were further added to the example shown in FIG. 7. In detail, as in the portions (A) of FIGS. 6 and 7, a portion (A) of FIG. 8 shows the temporal changes of a grip force Fz [N], a camber angle CA [deg], and a slip angle SA [deg] to be given to the tire T by the tire angle control portion 7 of the tire ground contact characteristic measuring portion 100 according to the first embodiment. As in the portions (B) of FIGS. 6 and 7, a portion (B) of FIG. 8 shows the traveling states of the actual vehicle corresponding to the temporal changes of a grip force Fz [N], a camber angle CA [deg], and a slip angle SA [deg] shown in the portion (A) of FIG. 8.

After the ground contact characteristics of the tire T at all the ground contact positions accompanied by transient changes as described above are measured, stress data at a plurality of positions in the circumferential direction on the tread surface T1 of the tire T, which are measured by the stress measuring portion 3, are synthesized by the processing portion 4 as shown in the portion (D) of FIG. 5 in the example shown in FIG. 5. After that, the processing portion 4 can generate, for example, a visualized grip force distribution in the ground contact region T1A as shown in the portion € of FIG. 5. Further, in a case where the rotational position of the rotary drum 1 and the rotational position of the tire T are synchronized with each other and measured by the drum-side rotational position detecting portion 8 and the tire-side rotational position detecting portion 9 in the tire ground contact characteristic measuring portion 100 according to the second embodiment, the measurement of a tire footprint including patterns (i.e., the calculation of the tire ground contact characteristics of the ground contact region T1A including lug grooves and the like) can also be achieved.

FIG. 9 is a diagram showing the temporal changes of a grip force Fz [N], a camber angle CA [deg], and a slip angle SA [deg] to be given to the tire T by the tire angle control portion 7 of the tire ground contact characteristic measuring portion 100 according to the second embodiment.

In FIG. 9, a time A corresponds to a time t23 shown in the portion (A) of FIG. 8. A time B corresponds to the time t30 shown in FIGS. 6 to 8. A time C corresponds to the time t32 shown in FIG. 8. A time D corresponds to the time t36 shown in FIG. 8. A time E corresponds to the time t44 shown in FIG. 8.

Through the diligent research of the inventor, in order to reproduce a transient change in the tire attitude of the actual vehicle occurring during the change of a lane shown in the portion (B) of FIG. 6 on the tire T, the tire angle control portion 7 of the tire ground contact characteristic measuring portion 100 according to the second embodiment changed a grip force Fz [N], a camber angle CA [deg], and a slip angle SA [deg] as shown in FIG. 9 and gave the grip force Fz [N], the camber angle CA [deg], and the slip angle SA [deg] to the tire T.

Through diligent research, the inventor has found out that tire ground contact characteristics at the times A, B, C, D, and E calculated by the processing portion 4 of the tire ground contact characteristic measuring portion 100 according to the second embodiment are also different from tire ground contact characteristics at the times A, B, C, D, and E calculated by the conventional tire ground contact characteristic measuring portion.

The processing shown in FIG. 12 is performed in the tire ground contact characteristic measuring portion 100 according to the second embodiment as in the tire ground contact characteristic measuring portion 100 according to the first embodiment. However, as a precondition for the reproduction of a transient change in a tire attitude, the rotational position of the drum and the rotational position of the tire are adjusted at each measurement point by using a driving portion, a braking portion, and the like such that the reference position B to be measured and the stress measuring portion coincide with each other.

Third Embodiment

A third embodiment of the tire ground contact characteristic measuring portion 100 according to the present invention will be described below.

A tire ground contact characteristic measuring portion 100 included in a tire ground contact characteristic measuring system 400 according to the third embodiment has the same configuration as the above-mentioned tire ground contact characteristic measuring portion 100 according to the first embodiment or the second embodiment except for points that will be described below. Therefore, according to the tire ground contact characteristic measuring system 400 of the third embodiment, it is possible to obtain the same effects as those of the above-mentioned tire ground contact characteristic measuring portion 100 according to the first embodiment or the second embodiment except for points that will be described below.

FIG. 13 is a diagram showing the configuration of an example of the tire ground contact characteristic measuring system 400 according to the third embodiment.

In the example shown in FIG. 13, the tire ground contact characteristic measuring system 400 includes a tire ground contact characteristic measuring portion 100, a vehicle characteristic measuring portion 200, and a vehicle behavior simulation portion 300.

As described above, the tire ground contact characteristic measuring portion 100 shown in FIG. 13 has the same configuration as the tire ground contact characteristic measuring portion 100 according to the second embodiment.

The vehicle characteristic measuring portion 200 includes: a test vehicle 201 that includes a vehicle body 203, wheels 202, and a steering wheel 205; a mount portion (suspension characteristic measuring portion) 210; and a controller (computer) 220.

The mount portion 210 includes support parts 214 on which the test vehicle 201 is to be placed and a measuring instrument 215.

The support parts 214 can independently displace the vehicle body 203 and the wheels 202. In detail, the support parts 214 can independently displace the vehicle body 203 and the wheels 202 in a longitudinal direction, a lateral direction, a vertical direction, a pitch direction, and a roll direction of the test vehicle 201. The support parts 214 may be slidable with respect to the wheels 202 such that the generation of a longitudinal force, a lateral force, a cornering force, a slip ratio, and a slip angle that can be generated on a tire T during the travel of a vehicle can be achieved.

The measuring instrument 215 measures the amount of displacement and/or the acting force of the vehicle body 203 and the amounts of displacement and/or the acting forces of the wheels 202. In detail, the measuring instrument 215 measures acting forces that act on the support parts 214. Further, the measuring instrument 215 measures the camber angles, the toe angles, the steering angles, and the like of the wheels 202. Furthermore, the measuring instrument 215 measures a force or torque that acts on an axle (not shown). Moreover, the measuring instrument 215 measures the stroke and the acting force of a suspension.

The controller 220 controls the amount of displacement that is given to the vehicle body 203 by the support parts 214, and the amounts of displacement that are given to the wheels 202 by the support parts 214.

A mechanism that drives the steering wheel 205 to control the steering angles of the wheels 202 is provided in the example shown in FIG. 13, but the steering wheel 205 may not be provided in other examples.

In the example shown in FIG. 13, the vehicle behavior simulation portion 300 predicts the behavior of the actual vehicle during travel on the basis of the tire ground contact characteristics that have been calculated by the processing portion 4 of the tire ground contact characteristic measuring portion 100 and the amount of displacement and/or the acting force of the vehicle body 203 and the amounts of displacement and/or the acting forces of the wheels 202 that have been measured by the measuring instrument 215 of the vehicle characteristic measuring portion 200.

The vehicle behavior simulation portion 300 is a computer that simulates the behavior of the actual vehicle during travel; includes a CPU as an arithmetic processing portion, a ROM, a RAM, and an HDD as a storage portion, and an interface as a communication portion; and operates on the basis of a program stored in the storage portion. Further, the vehicle behavior simulation portion 300 includes an input portion, such as a keyboard and a mouse and the like, and a display portion, such as a monitor and the lilke. The input portion includes a steering wheel, an accelerator, a brake, and the like and can also reproduce a driving state. The input portion is operated by a worker, and parameters and the like required to predict the behavior of the actual vehicle during travel are input to the input portion. The estimated behavior of the actual vehicle during travel and the like are displayed on the display portion.

In the example shown in FIG. 13, the vehicle behavior simulation portion 300 predicts the motion state of the actual vehicle during travel by using the measurement data of the measuring instrument 215. The processing portion 4 and the tire angle control portion 7 of the tire ground contact characteristic measuring portion 100 reproduces a transient change in a tire attitude on the tire T on the basis of the predicted motion state.

Further, in the example shown in FIG. 13, the vehicle characteristic measuring portion 200 can also reflect vehicle characteristics, which are predicted from the tire ground contact characteristics calculated by the processing portion 4 of the tire ground contact characteristic measuring portion 100, in the test vehicle 201. Specifically, it is possible to more faithfully reproduce the behavior of the vehicle by inputting tire ground contact characteristics at each point in time to the vehicle behavior simulation portion 300. The measuring instrument 215 measures the amounts of displacement and/or the acting forces of the vehicle body 203 and the wheels 202 of the test vehicle 201 in which the tire ground contact characteristics calculated by the processing portion 4 are reflected.

Furthermore, in the tire ground contact characteristic measuring portion 100, at least one of the change of the rotational speed of the rotary drum 1 performed by the drum driving portion 2, the change of the position of the tire T with respect to the rotary drum 1 performed by the tire position control portion 5, the change of the rotational speed of the tire T performed by the tire driving portion 6, and the change of the angle of the tire T performed by the tire angle control portion 7 is performed on the basis of the measurement data of the measuring instrument 215 in which vehicle characteristics predicted from the tire ground contact characteristics calculated by the processing portion 4 are reflected.

Moreover, in the example shown in FIG. 13, after at least one of the change of the rotational speed of the rotary drum 1 performed by the drum driving portion 2, the change of the position of the tire T with respect to the rotary drum 1 performed by the tire position control portion 5, the change of the rotational speed of the tire T performed by the tire driving portion 6, and the change of the angle of the tire T performed by the tire angle control portion 7 is performed, the vehicle characteristics predicted from the tire ground contact characteristics calculated by the processing portion 4 are reflected and the controller 220 of the vehicle characteristic measuring portion 200 can control the amount of displacement that is given to the vehicle body 203 by the support parts 214 and the amounts of displacement that are given to the wheels 202 by the support parts 214.

Figure 14:
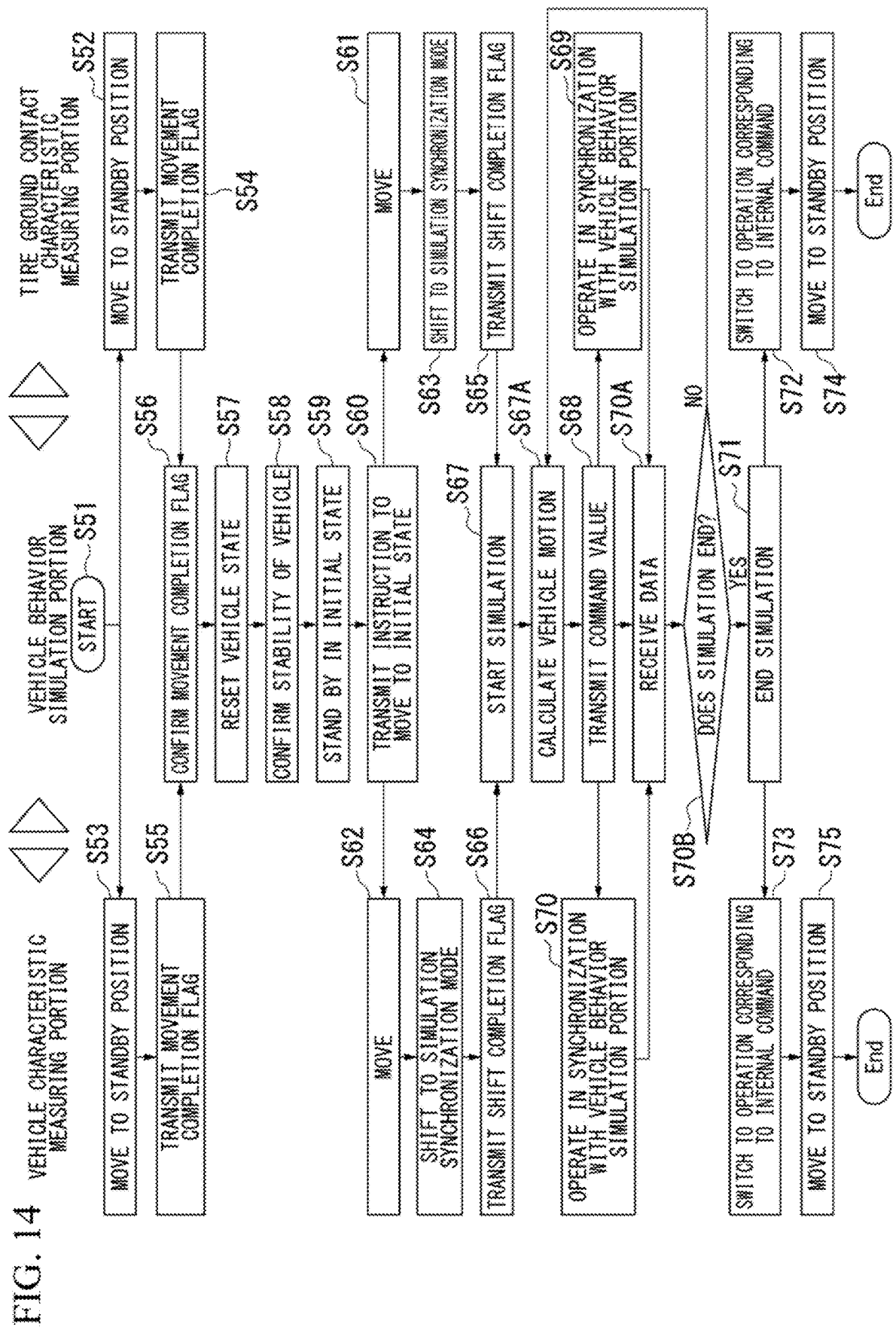
FIG. 14 is a sequence diagram showing an example of processing performed in a tire ground contact characteristic measuring system according to the second embodiment.

FIG. 14 is a sequence diagram showing an example of processing performed in the tire ground contact characteristic measuring system 400 according to the third embodiment.

In an example shown in FIG. 14, in Step S51, the vehicle behavior simulation portion 300 starts the preprocessing of simulation.

Then, in Step S52, the tire ground contact characteristic measuring portion 100 is moved to a standby position.

Further, in Step S53, the vehicle characteristic measuring portion 200 is moved to a standby position.

Then, in Step S54, the tire ground contact characteristic measuring portion 100 transmits a movement completion flag to the vehicle behavior simulation portion 300.

Further, in Step S55, the vehicle characteristic measuring portion 200 transmits a movement completion flag to the vehicle behavior simulation portion 300.

Then, in Step S56, the vehicle behavior simulation portion 300 confirms the movement completion flag that is transmitted from the tire ground contact characteristic measuring portion 100 and the movement completion flag that is transmitted from the vehicle characteristic measuring portion 200.

After that, in Step S57, the vehicle behavior simulation portion 300 resets the vehicle state of the simulation.

Then, in Step S58, the vehicle behavior simulation portion 300 confirms the stability of the vehicle of the simulation.

After that, in Step S59, the vehicle behavior simulation portion 300 stands by for the simulation in an initial state.

Then, in Step S60, the vehicle behavior simulation portion 300 transmits an instruction to move to an initial state to the tire ground contact characteristic measuring portion 100 and transmits an instruction to move to an initial state to the vehicle characteristic measuring portion 200.

After that, in Step S61, the tire ground contact characteristic measuring portion 100 is moved according to the instruction transmitted from the vehicle behavior simulation portion 300.

Further, in Step S62, the vehicle characteristic measuring portion 200 is moved according to the instruction transmitted from the vehicle behavior simulation portion 300.

Then, in Step S63, the tire ground contact characteristic measuring portion 100 shifts to a simulation synchronization mode where the tire ground contact characteristic measuring portion 100 operates in synchronization with the vehicle behavior simulation portion 300.

Furthermore, in Step S64, the vehicle characteristic measuring portion 200 shifts to a simulation synchronization mode where the vehicle characteristic measuring portion 200 operates in synchronization with the vehicle behavior simulation portion 300.

After that, in Step S65, the tire ground contact characteristic measuring portion 100 transmits a shift completion flag, which indicates the completion of shift to the simulation synchronization mode, to the vehicle behavior simulation portion 300.

Further, in Step S66, the vehicle characteristic measuring portion 200 transmits a shift completion flag, which indicates the completion of shift to the simulation synchronization mode, to the vehicle behavior simulation portion 300.

Then, in Step S67, the vehicle behavior simulation portion 300 confirms the shift completion flag transmitted from the tire ground contact characteristic measuring portion 100, and the shift completion flag transmitted from the vehicle characteristic measuring portion 200, and starts the simulation.

After that, in Step S67A, the vehicle behavior simulation portion 300 calculates the vehicle motion of the simulation.

Then, in Step S68, the vehicle behavior simulation portion 300 sends command values to the tire ground contact characteristic measuring portion 100 and the controller 220 of the vehicle characteristic measuring portion 200. Likewise, the vehicle behavior simulation portion 300 can transmit a command value to the electronic control unit (ECU) (not shown). An electronic control unit mounted on the test vehicle 201 of the vehicle characteristic measuring portion 200 can be used as the ECU. Usually, command values based on the predicted vehicle characteristics can be used as simulation signals substituting for signals to be input to the ECU from various sensors that are used to grasp the traveling state of the vehicle.

The command values to be transmitted to the ECU from the vehicle model include a wheel speed, a yaw rate, the acceleration of the vehicle, acceleration acting on the axis of the tire, and information for complementing vehicle characteristics for various sensors, such as a front radar and a camera. Since these kinds of information are reflected in the ECU and the test vehicle is caused to recognize a traveling state, simulation where a traveling state is accurately reproduced can be performed.

Further, in Step S69, the tire ground contact characteristic measuring portion 100 operates according to the command values transmitted from the vehicle behavior simulation portion 300 (that is, in synchronization with the vehicle behavior simulation portion 300). In detail, the tire ground contact characteristic measuring portion 100 operates while reflecting the vehicle characteristics (in particular, the axial force of the tire) obtained from the vehicle behavior simulation portion 300. Furthermore, the tire ground contact characteristic measuring portion 100 transmits the data of the tire ground contact characteristics to the vehicle behavior simulation portion 300.

In Step S70, the vehicle characteristic measuring portion 200 operates according to the command values transmitted from the vehicle behavior simulation portion 300 (i.e., in synchronization with the vehicle behavior simulation portion 300). In detail, the vehicle characteristic measuring portion 200 operates while reflecting the vehicle characteristics (i.e., in particular, the axial force of the tire) obtained from the vehicle behavior simulation portion 300. Further, the vehicle characteristic measuring portion 200 inputs the command values, which are transmitted from the vehicle behavior simulation portion 300, to the ECU mounted on the test vehicle 201. Furthermore, the vehicle characteristic measuring portion 200 transmits measurement data to the vehicle behavior simulation portion 300.

That is, Steps S68, S69, and S70 are performed in parallel, and the tire ground contact characteristic measuring portion 100, the vehicle characteristic measuring portion 200, and the vehicle behavior simulation portion 300 operate in synchronization with each other.

Then, in Step S70A, the vehicle behavior simulation portion 300 receives data (i.e., the data of the tire ground contact characteristics and the measurement data) from the tire ground contact characteristic measuring portion 100 and the vehicle characteristic measuring portion 200.

After that, in Step S70B, the vehicle behavior simulation portion 300 determines whether or not it is time to end the simulation and whether or not the travel distance of the vehicle of the simulation has reached a scheduled travel distance.

In a case where it is not time to end the simulation or in a case where the travel distance of the vehicle of the simulation has not reached the scheduled travel distance, processing returns to Step S67A. On the other hand, in a case where it is time to end the simulation and in a case where the travel distance of the vehicle of the simulation has reached the scheduled travel distance, processing proceeds to Step S71.

In Step S71, the vehicle behavior simulation portion 300 ends the simulation.

Accordingly, in Step S72, the operation of the tire ground contact characteristic measuring portion 100 is switched to an operation corresponding to an internal command.

Further, in Step S73, the operation of the vehicle characteristic measuring portion 200 is switched to an operation corresponding to an internal command.

After that, in Step S74, the tire ground contact characteristic measuring portion 100 is moved to the standby position.

Furthermore, in Step S75, the vehicle characteristic measuring portion 200 is moved to the standby position.

That is, in the tire ground contact characteristic measuring method according to an aspect of the present invention, the tire ground contact characteristics of the tire corresponding to the tire attitude of the actual vehicle at each point in time during a period where a transient change in a tire attitude during the travel of the actual vehicle occurs are calculated in the calculation step.

For this reason, according to the tire ground contact characteristic measuring method of the aspect of the present invention, it is possible to obtain the tire ground contact characteristics corresponding to the tire attitude of the actual vehicle at each point in time during a period where a transient change in a tire attitude during the travel of the actual vehicle occurs.

In the stress measurement step of the tire ground contact characteristic measuring method according to one aspect of the present invention, a rotational speed of the rotary drum is adjusted by a drum driving portion, a position of the tire with respect to the rotary drum is adjusted in a direction of an axis of rotation and/or a radial direction of the rotary drum by a tire position control portion, a rotational speed of the tire is adjusted by a tire driving portion, and a camber angle, a slip angle, and/or a grip force of the tire is adjusted by a tire angle control portion.

In a case where such operations are performed in the stress measurement step, the transient change in the tire attitude occurring during the travel of the actual vehicle can be reproduced on the tire more accurately than in a case where such operations are not performed in the stress measurement step.

In the stress measurement step of the tire ground contact characteristic measuring method according to one aspect of the present invention, a three-component force sensor serving as the stress measuring portion may measure a grip force, shear stress in a width direction, and shear stress in a circumferential direction that are applied to the tire.

In a case where a three-component force sensor measures a grip force, shear stress in a width direction, and shear stress in a circumferential direction applied to the tire in the stress measurement step, a grip force distribution, a shear stress distribution in the width direction, and a shear stress distribution in the circumferential direction can be calculated as tire ground contact characteristics.

In the tire ground contact characteristic measuring method according to one aspect of the present invention, a drum driving portion may rotationally drive the rotary drum and a tire driving portion may rotationally drive the tire to bring the stress measuring portion into contact with a plurality of points arranged on the tread surface of the tire in a circumferential direction; the stress measuring portion may measure stress applied to the tire at the plurality of points; a tire-side rotational position detecting portion may detect a rotational position of the tire corresponding to each of the plurality of points; the stress measuring portion may repeatedly measure stress applied to the tire and the tire-side rotational position detecting portion may repeatedly detect the rotational position of the tire while a tire position control portion changes a position of the tire with respect to the rotary drum in a direction of an axis of rotation of the rotary drum, such that a processing portion calculates a grip force distribution, a shear stress distribution in a width direction, and a shear stress distribution in the circumferential direction in the ground contact region; and the processing portion may calculate the tire ground contact characteristics at each point in time during the period where the transient change occurs by synthesizing a grip force distribution, a shear stress distribution in the width direction, and/or a shear stress distribution in the circumferential direction at each point in the ground contact region.

In a case where the stress measuring portion is brought into contact with a plurality of points arranged on the tread surface of the tire in the circumferential direction as described above, the stress measuring portion repeatedly measures stress applied to the tire, the processing portion calculates a grip force distribution, a shear stress distribution in the width direction, and a shear stress distribution in the circumferential direction in the ground contact region, and the processing portion synthesizes a grip force distribution, a shear stress distribution in the width direction, and/or a shear stress distribution in the circumferential direction at each point in the ground contact region, it is possible to obtain grip force distributions, shear stress distributions in the width direction, and/or shear stress distributions in the circumferential direction at the plurality of points arranged on the tread surface of the tire in the circumferential direction.

In the reproduction step of reproducing the transient change on the tire, of the tire ground contact characteristic measuring method according to one aspect of the present invention, a support part of a mount portion of a vehicle characteristic measuring portion may independently displace a vehicle body and a wheel of a test vehicle provided in the vehicle characteristic measuring portion, a measuring instrument of the mount portion may measure an amount of displacement and/or an acting force of the vehicle body and an amount of displacement and/or an acting force of the wheel, a controller provided in the vehicle characteristic measuring portion may control the amount of displacement to be given to the vehicle body by the support part and the amount of displacement to be given to the wheel by the support part, and a processing portion may predict a motion state of the actual vehicle during travel by using measurement data of the measuring instrument and may reproduce the transient change in the tire attitude on the tire on the basis of the predicted motion state.

In a case where the processing portion predicts a motion state of the actual vehicle during travel by using measurement data of the measuring instrument and reproduces a transient change in a tire attitude on the tire on the basis of the motion state, tire ground contact characteristics, in which, for example, vehicle characteristics, such as a suspension, are reflected, can be obtained unlike in a case where the measurement data of the measuring instrument is not used. Accordingly, the ground contact characteristics of the tire can be measured under conditions closer to the actual vehicle.

In the tire ground contact characteristic measuring method according to one aspect of the present invention, it is possible to predict vehicle characteristics, such as the axial force of the tire and the like, by reflecting the measured stress and a ground contact load in a vehicle model that is used to simulate the behavior of the actual vehicle. A vehicle characteristic measuring portion may reflect predicted vehicle characteristics, such as the axial force of the tire and the like, in a test vehicle; a measuring instrument may measure amounts of displacement and/or acting forces of a vehicle body and a wheel of the test vehicle in which the vehicle characteristics are reflected; and at least one of a change of a rotational speed of the rotary drum performed by the drum driving portion, a change of a position of the tire with respect to the rotary drum performed by the tire position control portion, a change of a rotational speed of the tire performed by the tire driving portion, and a change of an angle of the tire performed by the tire angle control portion may be performed on the basis of measurement data of the measuring instrument in which the vehicle characteristics are reflected.

In a case where the vehicle characteristics, such as the axial force of the tire and the like, predicted by the actual vehicle behavior simulator are reflected in the test vehicle, the vehicle characteristic measuring portion can measure vehicle characteristics with higher accuracy than in a case where the vehicle characteristics are not reflected in the test vehicle.

In the tire ground contact characteristic measuring method according to one aspect of the present invention, a command based on the predicted vehicle characteristics may be transmitted to an electronic control unit of the test vehicle to cause the electronic control unit of the test vehicle to recognize a traveling state.

In a case where a command based on the predicted vehicle characteristics is transmitted to the electronic control unit of the test vehicle to cause the electronic control unit of the test vehicle to recognize a traveling state, it is possible to obtain tire ground contact characteristics with higher accuracy than in a case where the electronic control unit of the test vehicle is not caused to recognize a traveling state.

A tire ground contact characteristic measuring portion according to one aspect of the present invention includes: a rotatable rotary drum; a drum driving portion that rotationally drives the rotary drum; a stress measuring portion that is embedded on the rotary drum and measures stress applied to a tire in contact with the rotary drum; a tire position control portion that controls a position of the tire with respect to the rotary drum; a tire driving portion that rotationally drives the tire; a tire angle control portion that controls an angle of the tire with respect to the rotary drum; and a processing portion that calculates tire ground contact characteristics, which are characteristics of a ground contact region of a tread surface of the tire in contact with the rotary drum, on the basis of the stress measured by the stress measuring portion. The drum driving portion, the tire position control portion, the tire driving portion, and the tire angle control portion operate to reproduce a transient change in a tire attitude that occurs during travel of an actual vehicle on the tire, and the processing portion calculates the tire ground contact characteristics corresponding to a tire attitude of the actual vehicle at each point in time during a period where the transient change occurs.

That is, in the tire ground contact characteristic measuring portion according to one aspect of the present invention, the tire ground contact characteristics of the tire corresponding to the tire attitude of the actual vehicle at each point in time during the period where the transient change in the tire attitude during the travel of the actual vehicle occurs can be calculated by the processing portion.

For this reason, according to the tire ground contact characteristic measuring portion of one aspect of the present invention, it is possible to obtain the tire ground contact characteristics corresponding to the tire attitude of the actual vehicle at each point in time during the period where the transient change in the tire attitude during the travel of the actual vehicle occurs.

In the tire ground contact characteristic measuring portion according to one aspect of the present invention, the drum driving portion may adjust a rotational speed of the rotary drum, the tire position control portion may adjust the position of the tire with respect to the rotary drum in a direction of an axis of rotation and/or a radial direction of the rotary drum, the tire driving portion may adjust a rotational speed of the tire, and the tire angle control portion may adjust a camber angle, a slip angle, and/or a grip force of the tire.

In a case where the rotational speed of the rotary drum can be adjusted, the position of the tire with respect to the rotary drum can be adjusted in the direction of the axis of rotation and/or the radial direction of the rotary drum, the rotational speed of the tire can be adjusted, and the camber angle, the slip angle, and/or the grip force of the tire can be adjusted, a transient change in a tire attitude that occurs during the travel of the actual vehicle can be reproduced on the tire more accurately than in a case where any one of these cannot be adjusted.

In the tire ground contact characteristic measuring portion according to one aspect of the present invention, the stress measuring portion may be a three-component force sensor that can measure a grip force, shear stress in a width direction, and shear stress in a circumferential direction applied to the tire.

In a case where the stress measuring portion is the three-component force sensor, the processing portion can calculate a grip force distribution, a shear stress distribution in the width direction, and a shear stress distribution in the circumferential direction as tire ground contact characteristics.

The tire ground contact characteristic measuring portion according to one aspect of the present invention may further include a tire-side rotational position detecting portion that detects a rotational position of the tire; the drum driving portion may rotationally drive the rotary drum and the tire driving portion may rotationally drive the tire to bring the stress measuring portion into contact with a plurality of points arranged on the tread surface of the tire in a circumferential direction; the stress measuring portion may measure stress applied to the tire at the plurality of points; the tire-side rotational position detecting portion may detect a rotational position of the tire corresponding to each of the plurality of points; the stress measuring portion may repeatedly measure stress applied to the tire and the tire-side rotational position detecting portion may repeatedly detect the rotational position of the tire while the tire position control portion changes a position of the tire with respect to the rotary drum in a direction of an axis of rotation of the rotary drum, such that the processing portion calculates a grip force distribution, a shear stress distribution in a width direction, and a shear stress distribution in the circumferential direction in the ground contact region; and the processing portion may calculate the tire ground contact characteristics at each point in time during the period where the transient change occurs by synthesizing a grip force distribution, a shear stress distribution in the width direction, and/or a shear stress distribution in the circumferential direction at each point in the ground contact region.

In a case where the stress measuring portion is brought into contact with a plurality of points arranged on the tread surface of the tire in the circumferential direction as described above, the stress measuring portion repeatedly measures stress applied to the tire, the processing portion calculates the grip force distribution, the shear stress distribution in the width direction, and the shear stress distribution in the circumferential direction in the ground contact region, and the processing portion synthesizes the grip force distribution, the shear stress distribution in the width direction, and/or the shear stress distribution in the circumferential direction at each point in the ground contact region, it is possible to obtain grip force distributions, shear stress distributions in the width direction, and/or shear stress distributions in the circumferential direction at the plurality of points arranged on the tread surface of the tire in the circumferential direction.

A tire ground contact characteristic measuring system according to one aspect of the present invention includes the tire ground contact characteristic measuring portion, a vehicle characteristic measuring portion, and an actual vehicle behavior simulator; the vehicle characteristic measuring portion includes a test vehicle that includes a vehicle body and a wheel, a mount portion, and a controller; the mount portion includes a support part on which the test vehicle is to be placed and a measuring instrument; the support part independently displaces the vehicle body and the wheel; the measuring instrument measures an amount of displacement and/or an acting force of the vehicle body and an amount of displacement and/or an acting force of the wheel; the controller controls the amount of displacement to be given to the vehicle body by the support part and the amount of displacement to be given to the wheel by the support part; and the processing portion predicts a motion state of the actual vehicle during travel by using measurement data of the measuring instrument and reproduces the transient change in a tire attitude on the tire on the basis of the predicted motion state.

That is, in the tire ground contact characteristic measuring system according to one aspect of the present invention, the processing portion predicts a motion state of the actual vehicle during travel by using measurement data of the measuring instrument and reproduces a transient change in a tire attitude on the tire on the basis of the motion state.

For this reason, according to the tire ground contact characteristic measuring system of one aspect of the present invention, tire ground contact characteristics, in which, for example, vehicle characteristics, such as a suspension, are reflected, can be obtained unlike in a case where the measurement data of the measuring instrument is not used.

In the tire ground contact characteristic measuring system according to one aspect of the present invention, the vehicle characteristic measuring portion may reflect vehicle characteristics, which are predicted from the tire ground contact characteristics calculated by the processing portion, in the test vehicle; the measuring instrument may measure the amounts of displacement and/or the acting forces of the vehicle body and the wheel of the test vehicle in which the vehicle characteristics are reflected; and at least one of a change of a rotational speed of the rotary drum performed by the drum driving portion, a change of a position of the tire with respect to the rotary drum performed by the tire position control portion, a change of a rotational speed of the tire performed by the tire driving portion, and a change of an angle of the tire performed by the tire angle control portion may be performed on the basis of measurement data of the measuring instrument in which the vehicle characteristics are reflected.

In a case where the vehicle characteristics predicted from the tire ground contact characteristics calculated by the processing portion are reflected in the test vehicle, the vehicle characteristic measuring portion can measure vehicle characteristics with higher accuracy than in a case where the vehicle characteristics predicted from the tire ground contact characteristics calculated by the processing portion are not reflected in the test vehicle.

In the tire ground contact characteristic measuring system according to one aspect of the present invention, a command based on the predicted vehicle characteristics may be transmitted to an electronic control unit of the test vehicle to cause the electronic control unit of the test vehicle to recognize a traveling state.

In a case where a command based on the predicted vehicle characteristics is transmitted to the electronic control unit of the test vehicle to cause the electronic control unit of the test vehicle to recognize a traveling state, it is possible to obtain tire ground contact characteristics with higher accuracy than in a case where the electronic control unit of the test vehicle is not caused to recognize a traveling state.

In addition, the components of the above-mentioned embodiments can be appropriately replaced with well-known components without departing from the scope of the present invention, and the above-mentioned embodiments and the respective examples may be appropriately combined.

INDUSTRIAL APPLICABILITY

In a case where the tire ground contact characteristic measuring method, the tire ground contact characteristic measuring portion, and the tire ground contact characteristic measuring system according to the present invention are applied in a relevant field, it is possible to obtain tire ground contact characteristics corresponding to a tire attitude of an actual vehicle at each point in time during a period where a transient change in the tire attitude during the travel of the actual vehicle occurs.

REFERENCE SIGNS LIST

1: Rotary drum
2: Drum driving portion
2A: Drum shaft
3: Stress measuring portion
4: Processing portion
5: Tire position control portion
5A: Spindle shaft
6: Tire driving portion
7: Tire angle control portion
8: Drum-side rotational position detecting portion
9: Tire-side rotational position detecting portion
10: Tire pressure changing portion
100: Tire ground contact characteristic measuring portion
200: Vehicle characteristic measuring portion
201: Test vehicle
202: Wheel
203: Vehicle body
205: Steering wheel
210: Mount portion
214: Support part
215: Measuring instrument
220: Controller
300: Vehicle behavior simulation portion
T: Tire
T1: Tread surface
T1A: Ground contact region

The invention claimed is:

1. A tire ground contact characteristic measuring method comprising:
reproducing a transient change in a tire attitude that occurs during travel of an actual vehicle on a tire;
causing a stress measuring sensor embedded on a rotatable rotary drum to measure stress that is applied to the tire in contact with the rotary drum that is rotationally driven; and
calculating tire ground contact characteristics, which are characteristics of a ground contact region of a tread surface of the tire in contact with the rotary drum, on the basis of the stress measured by the stress measuring sensor,
wherein the calculated tire ground contact characteristics are tire ground contact characteristics of the tire corresponding to the tire attitude of the actual vehicle at each point in time during a period where the transient change occurs,
in the reproducing the transient change in the tire attitude that occurs during travel of the actual vehicle on the tire,
a rotational speed of the rotary drum is adjusted,
a position of the tire with respect to the rotary drum is adjusted in a direction of an axis of rotation and/or a radial direction of the rotary drum,
a rotational speed of the tire is adjusted,
a camber angle, a slip angle, and a grip force of the tire is adjusted, and
air pressure of the tire is adjusted,
in the reproducing the transient change in the tire attitude, the camber angle, the slip angle, and the grip force to be given to the tire are continuously changed with a passage of time from a start to an end during the period where the transient change occurs,
the stress measuring sensor continuously measures stress applied to the tire at least for each rotation of the rotary drum from the start to the end during the period where the transient change occurs,
amounts of displacement and/or acting forces of a vehicle body and a wheel of a test vehicle are measured,
a displacing the vehicle body and the wheel of the test vehicle is based on predicted vehicle characteristics,
at least one of a change of the rotational speed of the rotary drum, a change of the position of the tire with respect to the rotary drum, a change of the rotational speed of the tire, and a change of an angle of the tire is performed on the basis of measurement data based on the vehicle characteristics, and
a command based on the predicted vehicle characteristics is transmitted to an electronic control unit of the test vehicle to cause the electronic control unit of the test vehicle to recognize a traveling state.

2. The tire ground contact characteristic measuring method according to claim 1,
wherein, in the causing the stress measuring sensor to measure stress applied to the tire, a three-component force sensor serving as the stress measuring sensor measures a grip force, shear stress in a width direction, and shear stress in a circumferential direction that are applied to the tire.

3. The tire ground contact characteristic measuring method according to claim 1, wherein the rotary drum is driven rotationally and the tire is driven rotationally to bring the stress measuring sensor into contact with a plurality of points arranged on the tread surface of the tire in a circumferential direction, the stress measuring sensor measures stress applied to the tire at the plurality of points, a rotational position of the tire corresponding to each of the plurality of points is detected, the stress measuring sensor repeatedly measures stress applied to the tire and the rotational position of the tire is repeatedly detected while a position of the tire with respect to the rotary drum is changed in the direction of the axis of the rotation of the rotary drum, such that a grip force distribution, a shear stress distribution in a width direction, and a shear stress distribution in the circumferential direction in the ground contact region are calculated, and the tire ground contact characteristics at each point in time during the period where the transient change occurs by synthesizing the grip force distribution, the shear stress distribution in the width direction, and/or the shear stress distribution in the circumferential direction at each point in the ground contact region are calculated.

4. The tire ground contact characteristic measuring method according to claim 1, wherein, in the reproducing the transient change on the tire, a support part of a mount portion independently displaces a vehicle body and a wheel of a test vehicle, an amount of displacement and/or an acting force of the vehicle body and an amount of displacement and/or an acting force of the wheel are measured, the amount of displacement to be given to the vehicle body by the support part and the amount of displacement to be given to the wheel by the support part are controlled, and a motion state of the actual vehicle during the travel is predicted by using the measured amounts and the transient change in the tire attitude on the tire on the basis of the predicted motion state is reproduced.

5. A tire ground contact characteristic measuring system comprising:

a tire ground contact characteristic measuring portion;
a vehicle characteristic measurer; and
an actual vehicle behavior simulator,
wherein the tire ground contact characteristic measuring portion includes:
a rotatable rotary drum;
a drum driver that rotationally drives the rotary drum;
a stress measurer that is embedded on the rotary drum and measures stress applied to a tire in contact with the rotary drum;
a tire position controller that controls a position of the tire with respect to the rotary drum;
a tire driver that rotationally drives the tire;
a tire angle controller that controls an angle of the tire with respect to the rotary drum;
a tire pressure changer that adjusts air pressure of the tire; and
a processor that calculates tire ground contact characteristics, which are characteristics of a ground contact region of a tread surface of the tire in contact with the rotary drum, on the basis of the stress measured by the stress measurer, wherein the drum driver, the tire position controller, the tire driver, the tire angle controller, and the tire pressure changer operate to reproduce a transient change in a tire attitude that occurs during travel of an actual vehicle on the tire, the processor calculates the tire ground contact characteristics corresponding to the tire attitude of the actual vehicle at each point in time during a period where the transient change occurs, wherein the drum driver can adjust a rotational speed of the rotary drum, the tire position controller can adjust the position of the tire with respect to the rotary drum in a direction of an axis of rotation and/or a radial direction of the rotary drum, the tire driver can adjust a rotational speed of the tire, the tire angle controller can adjust a camber angle, a slip angle, and/or a grip force of the tire, the tire pressure changer can adjust the air pressure of the tire, the drum driver, the tire position controller, the tire driver, and the tire angle controller are operated during the period where the transient change occurs in order to reproduce the transient change in the tire attitude of the actual vehicle on the tire, the tire angle controller continuously changes the camber angle, the slip angle, and the grip force to be given to the tire with a passage of time from a start to an end during the period where the transient change occurs, the stress measuring sensor continuously measures stress applied to the tire at least for each rotation of the rotary drum from the start to the end during the period where the transient change occurs, the vehicle characteristic measurer includes a test vehicle that includes a vehicle body and a wheel, a mount, and a controller, the mount includes a supporter on which the test vehicle is to be placed and a measurer, the supporter independently displaces the vehicle body and the wheel, the measurer measures an amount of displacement and/or an acting force of the vehicle body and an amount of displacement and/or an acting force of the wheel, the controller controls the amount of displacement to be given to the vehicle body by the supporter and the amount of displacement to be given to the wheel by the supporter, and the processor predicts a motion state of the actual vehicle during travel by using measurement data of the measurer and reproduces the transient change in the tire attitude on the tire on the basis of the predicted motion state, the vehicle characteristic measurer reflects vehicle characteristics, which are predicted from the tire ground contact characteristics calculated by the processor, in the test vehicle, the measurer measures the amounts of displacement and/or the acting forces of the vehicle body and the wheel of the test vehicle in which the vehicle characteristics are reflected, and at least one of a change of a rotational speed of the rotary drum performed by the drum driver, a change of a position of the tire with respect to the rotary drum performed by the tire position controller, a change of a rotational speed of the tire performed by the tire driver, and a change of an angle of the tire performed by the tire angle controller is performed on the basis of measurement data of the measurer in which the vehicle characteristics are reflected.

6. The tire ground contact characteristic measuring system according to claim 5,
wherein the stress measurer is a three-component force sensor that can measure a grip force, shear stress in a width direction, and shear stress in a circumferential direction applied to the tire.

7. The tire ground contact characteristic measuring system according to claim 5,
wherein the tire ground contact characteristic measuring portion further includes a tire-side rotational position detector that detects a rotational position of the tire,
wherein the drum driver rotationally drives the rotary drum and the tire driver rotationally drives the tire to bring the stress measurer into contact with a plurality of points arranged on the tread surface of the tire in a circumferential direction,
the stress measurer measures stress applied to the tire at the plurality of points,
the tire-side rotational position detector detects a rotational position of the tire corresponding to each of the plurality of points,
the stress measurer repeatedly measures stress applied to the tire and the tire-side rotational position detector repeatedly detects the rotational position of the tire while the tire position controller changes a position of the tire with respect to the rotary drum in the direction of the axis of the rotation of the rotary drum, such that the processor calculates a grip force distribution, a shear stress distribution in a width direction, and a shear stress distribution in the circumferential direction in the ground contact region, and
the processor calculates the tire ground contact characteristics at each point in time during the period where the transient change occurs by synthesizing a grip force distribution, a shear stress distribution in the width direction, and/or a shear stress distribution in the circumferential direction at each point in the ground contact region.

8. The tire ground contact characteristic measuring system accordion to claim 5,
wherein a command based on the predicted vehicle characteristics is transmitted to an electronic controller of the test vehicle to cause the electronic controller of the test vehicle to recognize a travel state.

* * * * *